US011295274B1

(12) United States Patent
Ghasem Khan Ghajar et al.

(10) Patent No.: US 11,295,274 B1
(45) Date of Patent: Apr. 5, 2022

(54) CONVERSATIONAL AND LIVE INTERACTIONS DEVELOPMENT AND MARKETPLACE DISTRIBUTION SYSTEM AND PROCESS

(71) Applicants: Sepideh Ghasem Khan Ghajar, Mountain View, CA (US); Alberto Rabindranath d'Souza, Belmont, CA (US)

(72) Inventors: Sepideh Ghasem Khan Ghajar, Mountain View, CA (US); Alberto Rabindranath d'Souza, Belmont, CA (US)

( * ) Notice: Subject to any disclaimer, the term of this patent is extended or adjusted under 35 U.S.C. 154(b) by 765 days.

(21) Appl. No.: 15/869,343

(22) Filed: Jan. 12, 2018

Related U.S. Application Data

(60) Provisional application No. 62/421,598, filed on Nov. 14, 2016.

(51) Int. Cl.
*G06Q 10/10* (2012.01)
*G06Q 30/02* (2012.01)
(Continued)

(52) U.S. Cl.
CPC ............. *G06Q 10/107* (2013.01); *G06F 8/35* (2013.01); *G06F 9/547* (2013.01);
(Continued)

(58) Field of Classification Search
CPC ............. G06Q 10/107; G06Q 30/0253; G06Q 30/0277; G06Q 30/0619; G06Q 50/01; G06Q 30/016; G06F 8/35; G06F 9/547
See application file for complete search history.

(56) References Cited

U.S. PATENT DOCUMENTS

| 9,386,113 B1* | 7/2016 | Goncharuk | ............. H04L 51/32 |
| 2007/0143485 A1* | 6/2007 | Da Palma | ............. G06Q 10/10 |
| | | | 709/227 |

(Continued)

OTHER PUBLICATIONS

Mobile POS provider experiences rapid customer adoption of conversational SMS texting. (2015). Internet Business News, , NA. Retrieved from https://dialog.proquest.com (Year: 2015).*

(Continued)

*Primary Examiner* — Eric R Netzloff
*Assistant Examiner* — Michael R Stibley
(74) *Attorney, Agent, or Firm* — Plager Schack LLP; Mark Plager; Stephen Hallberg

(57) ABSTRACT

A conversational and live interactions development and marketplace distribution system and process are disclosed for the purpose of enhancing customer engagement experiences by implementing lead/customer engagement and call-to-action strategy in social media advertisement, digital marketing, and customer success. The conversational and live interactions development and marketplace distribution system includes a stateful network of live interaction plug-ins that are triggered on demand and on-the-fly from inside social media, applications, or messaging channels. The conversational and live interactions development and marketplace distribution system provides a platform for development of conversational and live interaction plug-ins, chatbots, and smart human chat components. The conversational and live interactions development and marketplace distribution system hosts a cloud marketplace for distribution of conversational and live interaction plug-ins, chatbots, and smart human chat components.

12 Claims, 9 Drawing Sheets

(51) Int. Cl.
*G06Q 50/00* (2012.01)
*G06Q 30/06* (2012.01)
*G06F 9/54* (2006.01)
*G06F 8/35* (2018.01)
*G06Q 30/00* (2012.01)

(52) U.S. Cl.
CPC ..... *G06Q 30/0253* (2013.01); *G06Q 30/0277* (2013.01); *G06Q 30/0619* (2013.01); *G06Q 50/01* (2013.01); *G06Q 30/016* (2013.01)

(56) References Cited

U.S. PATENT DOCUMENTS

| | | | |
|---|---|---|---|
| 2008/0152121 A1* | 6/2008 | Mandalia | H04M 3/51 379/265.01 |
| 2016/0065741 A1* | 3/2016 | Mezhibovsky | G06Q 30/016 379/265.12 |
| 2016/0349935 A1* | 12/2016 | Gelfenbeyn | G06Q 30/0601 |
| 2017/0069011 A1* | 3/2017 | Akkiraju | G06Q 30/0625 |
| 2017/0279747 A1* | 9/2017 | Melzer | H04L 51/046 |
| 2018/0069847 A1* | 3/2018 | Potnuru | H04L 63/08 |
| 2018/0075335 A1* | 3/2018 | Braz | G06F 16/24522 |
| 2018/0314603 A1* | 11/2018 | Gibbons, Jr | H04L 63/083 |

OTHER PUBLICATIONS

G. M. D'silva, S. Thakare, S. More and J. Kuriakose, "Real world smart chatbot for customer care using a software as a service (SaaS) architecture," 2017 International Conference on I-SMAC (IoT in Social, Mobile, Analytics and Cloud) (I-SMAC), 2017, pp. 658-664, doi: 10.1109/I-SMAC.2017.8058261. (Year: 2017).*

I. D. Addo, D. Do, R. Ge and S. I. Ahamed, "A Reference Architecture for Social Media Intelligence Applications in the Cloud," 2015 IEEE 39th Annual Computer Software and Applications Conference, 2015, pp. 906-913, doi: 10.1109/COMPSAC.2015.128. (Year: 2015).*

N. Piyush, T. Choudhury and P. Kumar, "Conversational commerce a new era of e-business," 2016 International Conference System Modeling & Advancement in Research Trends (SMART), 2016, pp. 322-327, doi: 10.1109/SYSMART.2016.7894543. (Year: 2016).*

* cited by examiner

CONVERSATIONAL AND LIVE INTERACTIONS DEVELOPMENT AND MARKETPLACE DISTRIBUTION SYSTEM AND PROCESS

CLAIM OF BENEFIT TO PRIOR APPLICATION

This application claims benefit to U.S. Provisional Patent Application 62/421,598, entitled "A Development Platform and Marketplace for Conversational Apps (Chatbots) and Smart Chat Components," filed Nov. 14, 2016. The U.S. Provisional Patent Application 62/421,598 is incorporated herein by reference.

BACKGROUND

Embodiments of the invention described in this specification relate generally to conversational and live interactions as a plugin apps (hereinafter referred to as "live interaction plug-ins"), and more particularly, to a conversational and live interactions development and marketplace distribution system and process that provides a platform for development of conversational and live interaction plug-ins, chatbots, and smart human chat components and that hosts a cloud marketplace for distribution of conversational and live interaction plug-ins, chatbots, and smart human chat components for the purpose of implementing lead/customer engagement and call-to-action strategy in social media advertisement, digital marketing, and customer success.

The present era is a time of high data content volume aggregation, which occurs every minute and every day, on social media and across vast networks. Therefore, the need for instant engagement and live interaction is on the rise for advertisement and marketing operations. However, there is a lack of live interaction strategies and built-in solutions that are available in the market and existing platforms fall short of providing solutions that meet a need for instant engagement or live interaction on social networks, especially in a stateful manner. Since existing platforms are not designed by default to facilitate this need, addressing such needs on existing platforms only scrapes the surface of what is needed and only does so through intense customization, which is typically labor intensive, time consuming, and expensive. The high costs of customization, implementation, and maintenance reduces return on investment (ROI), meaning that growth will become expensive. Additionally, many young technology companies seek to adopt the modern plug-ins and micros services in contrast to the old technologies on which most of the existing solutions are built.

Live interaction plug-ins are seen to be the fuel to the next generation of commercial applications and transactional workflows, including at least AI-enabled chatbots, human-enabled live chats, and hybrid implementations. The demand for such customer engagement experience is on the rise. However, there is no singular platform that can provide universal (and platform agnostic) standards, templates, and/or programming frameworks to allow a seamless adoption of such technology into existing platforms and channels, such as social media, messaging channels, and other social networks.

Specifically, existing platforms were not designed to facilitate channel-agnostic, stateful live interactions with customers or leads (on social media or messaging channels). Hence, live leads are not served in ways that maximize productivity by default. Instead, a large amount of customization is required to facilitate live interaction on those platforms. The existing solutions are mostly a set of tools which lack the means of implementing strategic approaches. Thus, any strategic approach requires a great amount of customization which is technically labor intensive, due to the disconnection between technology pieces that serve the advertising or marketing operations. As a result, meaningful interactive factors are missing at all levels.

Therefore, what is needed is a platform for live interaction plug-ins that is channel and platform agnostic and designed to work as a stateful network of pop-up extensions on social media and messaging channels and which automatically gathers data points via live interactions, analyzes them, and pushes them through data integration setups, thereby minimizing the amount of in-house customization and the cost of implementation, maintenance, and growth, while also providing a marketplace for custom plug-ins in which either external or internal developers are allowed to implement and deploy their live or interactive plug-ins for distribution by sale or share, thus allowing for a community of experts to arise who can provide their solutions or services at a minimal cost since the deployment, plug-in, and hosting process is already built and standardized.

BRIEF DESCRIPTION

A conversational and live interactions development and marketplace distribution system and a conversational and live interactions development and marketplace distribution process are disclosed for the purpose of enhancing customer engagement experiences by implementing lead/customer engagement and call-to-action strategy in social media advertisement, digital marketing, and customer success. In some embodiments, the conversational and live interactions development and marketplace distribution system provides a platform for development of conversational and live interaction plug-ins, chatbots, and smart human chat components. In some embodiments, the conversational and live interactions development and marketplace distribution system hosts a cloud marketplace for distribution of conversational and live interaction plug-ins, chatbots, and smart human chat components. In some embodiments, the conversational and live interactions development and marketplace distribution system provides a set of standards and templates that facilitate stateful live interactions with distributed web pop-ups that together can accomplish one business goal across fragmented audience channels such social media networks and messaging channels.

In some embodiments, the conversational and live interactions development and marketplace distribution system comprises a stateful network of live interaction plug-ins that are triggered on demand and on-the-fly from inside social media, application, messaging, and other communication channels. The live interaction plug-ins are mini apps or micro services that are connected at the backend by a thread ID and distributed on the front end by popping up and rendering (as "pop-up services") in various platforms and channels on demand. These services are designed to pop up instantly at audience or lead engagement and create momentum in a live and interactive manner to increase the lifetime and conversion rate of the engagement. The services perform stateful operations with traceability throughout their respective lifetime cycles. The conversational and live interactions development and marketplace distribution system includes off-the-shelf plug-ins and allows for the development of custom plug-ins that are easily deployed for an organization.

In some embodiments, the conversational and live interactions development and marketplace distribution system provides five major elements of a live interactions as a plug-in paradigm in a unified platform to enable development of live interaction plug-ins and deployment of the live interaction plug-ins to any software platform, including social media, messaging channels, and other social networks as a software. The five major elements of the live interactions as a plug-in paradigm include (i) state-sensitive chat flows, (ii) natural language processing (NLP), (iii) artificial intelligence (AI), (iv) custom business processes, and (v) data integration.

In some embodiments, the conversational and live interactions development and marketplace distribution process includes steps for channel registration, setting conversation and interaction rules in relation to the channels, providing the channel registry and rules to a realtime conversation interaction engine that monitors activities and events on the registered channels, posting interactive content in relation to detected activities and events on one or more registered channels, providing a public interface that is associated with at least one database, a set of native channels, and a set of third party channels, providing a marketplace for live interaction plug-ins, and analyzing all activities, events, and interactions over the registered channels.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
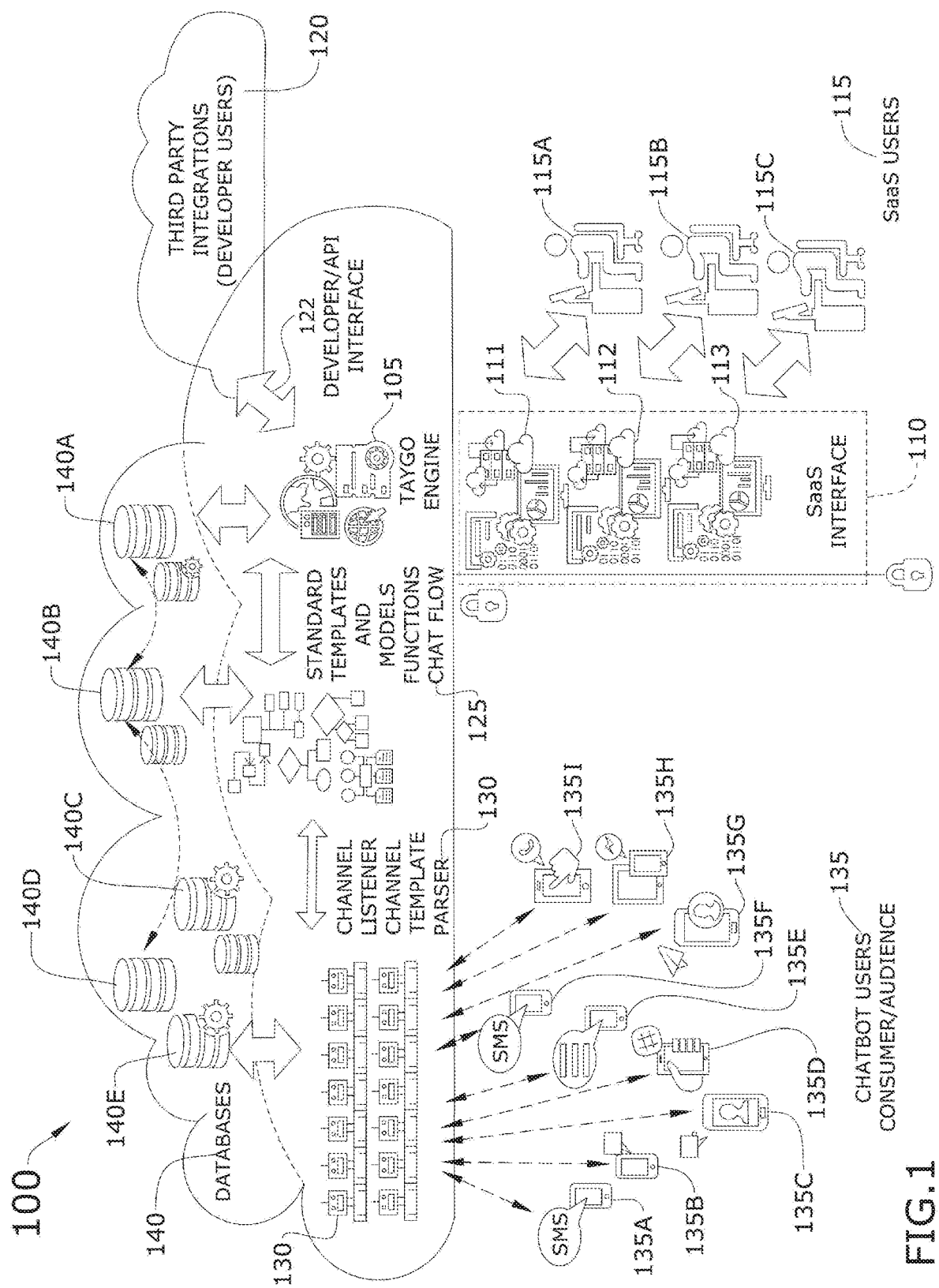
FIG. 1 conceptually illustrates a conversational and live interactions development and marketplace distribution system in some embodiments.

In the following detailed description of the invention, numerous details, examples, and embodiments of a conversational and live interactions development and marketplace distribution system for the purpose of enhancing customer engagement experiences are described. In describing these embodiments, reference is made to certain trademarks and/or word marks, including Facebook®, LinkedIn®, Instagram®, Twitter®, Braintree®, and Stripe™. Facebook® is a registered trademark of Facebook, Inc. LinkedIn® is a registered trademark of LinkedIn Corporation. Instagram® is a registered trademark of Instagram, LLC. Twitter® is a registered trademark of Twitter, Inc. Braintree® is a registered trademark of PayPal, Inc. The Stripe™ name and logos are trademarks or service marks of Stripe, Inc. or its affiliates in the U.S. and other countries. While reference is made to the products and technology associated with these trademarks and word marks, it will be clear and apparent to one skilled in the art that the scope of the invention is neither restricted by such products and technology nor to the embodiments set forth and that the invention can be adapted for any of several applications.

As defined in this specification, a channel is considered a digital platform or network or an implementation of a digital communication protocol which persons, businesses, organizations, or other entities may use to communicate externally. Examples of channels that persons, businesses, organizations, or other entities would use to communicate externally include, without limitation, Facebook, LinkedIn, Instagram, Twitter, email, SMS, other private messaging channels, etc.

Some embodiments of the invention include a novel conversational and live interactions development and marketplace distribution system for the purpose of enhancing customer engagement experiences by implementing lead/customer engagement and call-to-action strategy in social media advertisement, digital marketing, and customer success. In some embodiments, the conversational and live interactions development and marketplace distribution system provides a platform for development of conversational and live interaction plug-ins, chatbots, and smart human chat components. In some embodiments, the conversational and live interactions development and marketplace distribution system hosts a cloud marketplace for distribution of conversational and live interaction plug-ins, chatbots, and smart human chat components. In some embodiments, the conversational and live interactions development and marketplace distribution system provides a set of standards and templates that facilitate stateful live interactions with distributed web pop-ups that together can accomplish one business goal across fragmented audience channels such as social media networks and messaging channels.

In some embodiments, the conversational and live interactions development and marketplace distribution system comprises a stateful network of live interaction plug-ins that are triggered on demand and on-the-fly from inside channels for social networks, applications, and communication systems, including, without limitation, social media channels, application channels, messaging channels, and other communication channels. In some embodiments, the live interaction plug-ins are mini apps or micro services that are connected at the backend by a thread ID and distributed on the front end by popping up and rendering in various platforms or channels on demand (hereinafter referred to as "services," "pop-up services," or "interactive services"). These pop-up services are designed to appear or pop up instantly upon detection of audience or lead engagement. As such, the pop-up services create momentum within the engagement in a live and interactive manner to increase the lifetime and conversion rate of the engagement. For example, pop-up services are especially effective at increasing the lifetime and conversion rate of audience or lead engagements detected on social media networks and messaging channels. The services perform stateful operations with traceability throughout the lead life cycle or audience engagement cycle. In some embodiments, the conversational and live interactions development and marketplace distribution system includes off-the-shelf plug-ins and provides a platform for external developers to build custom plug-ins that are easily deployed for their operation or campaign as managed by the conversational and live interactions development and marketplace distribution system.

Some embodiments provides a novel conversational and live interactions development and marketplace distribution process. In some embodiments, the conversational and live interactions development and marketplace distribution process includes steps for channel registration, setting conversation and interaction rules in relation to the channels, providing the channel registry and rules to a realtime conversation interaction engine that monitors activities and events on the registered channels, posting interactive content in relation to detected activities and events on one or more registered channels, providing a public interface that is associated with at least one database, a set of native channels, and a set of third party channels, providing a marketplace for live interaction plug-ins, and analyzing all activities, events, and interactions over the registered channels.

In this specification, there are several descriptions of methods and processes that are implemented as software applications or computer programs which run on computing devices to perform conversational and live interactions development and marketplace distribution methods and/or processes. However, it should be noted that for the purposes of the embodiments described in this specification, the word "method" is used interchangeably with the word "process". Conversational and live interactions development and marketplace distribution processes or methods are described, therefore, by reference to example methods that conceptually illustrate steps of conversational and live interactions development and marketplace distribution processes which enhance customer engagement experiences by implementing lead/customer engagement and call-to-action strategy in social media advertisement, digital marketing, and customer success.

As stated above, live interactions as a plug-in are seen to be the fuel to the next generation of commercial applications and transactional workflows, including at least AI-enabled chatbots, human-enabled live chats, and hybrid implementations. The demand for such customer engagement experience is on the rise. However, there is no one platform that can provide universal (and platform agnostic) standards, templates or programming frameworks to allow a seamless adoption of such technology feature into existing software platforms like social media and other social networks as a software. Embodiments of the conversational and live interactions development and marketplace distribution system described in this specification solve such problems by way of a 'Live Interactions as a Plug-in' paradigm, in which there are five major elements involved in the creation of a successful experience (ideally one that leads to accomplishing a goal or transaction). The five major elements include (i) state-sensitive chat flows, (ii) natural language processing (NLP), (iii) artificial intelligence (AI), (iv) custom business processes, and (v) data integration. In some embodiments, the conversational and live interactions development and marketplace distribution system provides all five major elements in a unified platform to enable development and deployment of live interactions plug-ins to any software platform, including social media, messaging channels, and other social networks and communication systems.

Embodiments of the conversational and live interactions development and marketplace distribution system described in this specification differ from and improve upon currently existing options. In particular, the conversational and live interactions development and marketplace distribution system is the first cloud-compute network platform to offer a stateful network of live interaction plug-ins, as an extension to social media and messaging channels. These plug-ins are designed to generate live leads for advertisement, marketing operations, or testings. Not only do these plug-ins generate live leads but they also gather, maintain, and integrate data points as live interactions are developing. Examples of these plug-ins include, without limitation, AI-enabled interactions (e.g., chatbot), human enabled live chat, live video/data streaming, combinations of these plug-ins, etc.

In addition, the conversational and live interactions development and marketplace distribution system improves upon the currently existing options by providing standards, templates, frameworks, and micro services for development and deployment of plug-in extensions. These standards are made available to external developers via the conversational and live interactions development cloud system, thereby allowing developers to create new plug-ins for sale (or to share) via the conversational and live interactions cloud marketplace distribution system. With the rise of thousands of AI and chatbot developers, the conversational and live interactions cloud marketplace distribution system offers a technology community that AI-enabled plug-ins or extensions can be deployed and traded with minimal effort. These extensions and plug-ins are designed to be chat friendly and deployed as chat components or extensions agnostic to chat/messaging channels.

The conversational and live interactions development and marketplace distribution system of some embodiments is specifically designed as a cloud platform for live interactions as a plug-in. In some embodiments, the conversational and live interactions development and marketplace distribution system is channel and platform agnostic and designed to work as a stateful network of pop-up extensions on social media and messaging channels. In some embodiments, the conversational and live interactions development and marketplace distribution system automatically gathers data points via live interactions and pushes them through its analysis algorithms and data integration setups, by default. The amount of in-house customization with the conversational and live interactions development and marketplace distribution system is very minimal. This translates to a low cost of implementation, maintenance, and growth. In some embodiments, the conversational and live interactions development and marketplace distribution system also provides a market place for custom plug-ins. Either external or internal developers are allowed to implement and deploy their live or interactive plug-ins for sale or to share. This creates a community of experts who can provide their solutions or services at a minimal cost since the deployment, plug-in, and hosting process is already built and standardized across the platform supported by the conversational and live interactions development and marketplace distribution system.

The conversational and live interactions development and marketplace distribution system of the present disclosure may be comprised of the following elements. This list of possible constituent elements is intended to be exemplary only and it is not intended that this list be used to limit the conversational and live interactions development and marketplace distribution system of the present application to just these elements. Persons having ordinary skill in the art relevant to the present disclosure may understand there to be equivalent elements that may be substituted within the present disclosure without changing the essential function or operation of the conversational and live interactions development and marketplace distribution system.

1. Software-as-a-Service (SaaS) Interface
2. API Interface
3. Developer Interface
4. Conversation Builder
5. Development Platform
6. Marketplace
7. Conversation Engine
8. Standard Templates & Models
9. Channel Template Parser
10. Versioning
11. Chat Flow
12. Micro Services Extension
13. Events Monitoring and Analytics The various elements of the conversational and live interactions development and marketplace distribution system of the present disclosure may be related in the following exemplary fashion. It is not intended to limit the scope or nature of the relationships between the various elements and the following examples are presented as illustrative examples only. The conversational and live interactions development and marketplace distribution system is a cloud platform that has multiple interfaces, including at least an SaaS interface (#1), an API interface (#2), and developer interface (#3). In some embodiments, the API interface (#2) and the developer interface (#3) are the same interface or are part of a single common interface for developers to access the conversational and live interactions development and marketplace distribution system.

The SaaS interface (#1) of the conversational and live interactions development and marketplace distribution system is a web application that allows one to build and publish live interaction experiences (e.g., chatbot or live chat) as an extension (or plug-in) on social media or messaging channels. SaaS users build live interaction extensions or services (#12) using the conversation builder (#4), which is a code-free and easy-to-use web interface. Conversation builder (#4) is empowered by a library of micro services or plug-ins (#12) which is standardized via the marketplace (#6). These services include widgets, plug-ins, add-ons, or extensions, pluggable to live interactions, whether AI-enabled or not. The conversational and live interactions development and marketplace distribution system of some embodiments also provides an off-the-shelf set of services, called micro services (#6), which SaaS users can plug in to social media and messaging interactions. Moreover, subscribers can build their own plug-ins and upload to the marketplace (#6) for deployment to live operations through the development platform (#5). The development platform is available to developers via the developer interface (#3) and requires developer accounts. The marketplace (#6) bridges the developer interface (#3) with the SaaS interface (#1) by parsing submitted components and micro services to standard templates and models (#8), so that the SaaS interface (#1) can consume it.

Once live interactions are set up and deployed, the conversation engine (#7) hosts and serves them to respond to live interactions. The conversation engine (#7) uses the channel template parser (#9) to run a channel agnostic model and serve and preserve the state of interactions regardless of the channel. In some embodiments, the conversational and live interactions development and marketplace distribution system preserves the state of interaction (conversation) via its chat flow (#11) instant memory, in order to accomplish a meaningful business objective through a live interaction. Since the conversational and live interactions development and marketplace distribution system hosts a development platform, the conversational and live interactions development and marketplace distribution system supports a versioning model that allows different instances of plug-ins or extensions to run, which is managed by the versioning (#10) system. While interactions are running, the conversational and live interactions development and marketplace distribution system captures every event and action by the audience and feeds them back through the analytics and integration algorithms called events monitoring and analytics (#13).

Additional details of the architecture of the conversational and live interactions development and marketplace distribution system are described below, by reference to FIGS. 1 and 2. Furthermore, several more detailed embodiments are described in the sections below. Section I describes a conversational and live interactions development and marketplace distribution system and cloud service (SaaS). Section II describes event monitoring and analytics. Section III describes example inputs and functions of a conversational and live interactions development and marketplace distribution cloud service user interface. Section IV describes examples of conversational and live interactions development and marketplace distribution system runtime processes. Section V describes a conversational and live interactions development and marketplace distribution process. Section VI describes an electronic system that implements some embodiments of the invention.

I. Conversational and Live Interactions Development and Marketplace Distribution System and Cloud-Based Service The conversational and live interactions development and marketplace distribution system of the present disclosure generally works by way of a platform that provides a network of stateful live interaction plug-ins. These live interaction plug-ins are best used for time sensitive interactions with an audience, members of the audience, or individual customers for a specific purpose. One of the best uses of a network of stateful live interaction plug-ins is for advertising or marketing operations on social media and messaging channels.

By way of example, FIG. 1 conceptually illustrates a conversational and live interactions development and marketplace distribution system 100. As shown in this figure, the conversational and live interactions development and marketplace distribution system 100 includes a conversational and live interactions development and marketplace distribution engine 105, a SaaS user account interface ("SaaS interface") 110, SaaS account users ("SaaS users") 115, third party integrations and developer users 120, developer/API interface 122, standard templates and models functions chat flow 125, channel listener and channel template parser 130, audience chat bot consumer users 135, and DATABASES 140.

The conversational and live interactions development and marketplace distribution engine 105 is at the heart of the conversational and live interactions development and marketplace distribution system 100. In some embodiments, SaaS users 115 utilize the conversational and live interactions development and marketplace distribution engine 105 to build and publish live interaction experiences (e.g., chatbots, live chats, etc.) as plug-ins or extensions on social media or messaging channels. The SaaS users 115 shown in this figure include SaaS user 115A, SaaS user 115B, and SaaS user 115C. However, a person of ordinary skill in the art would understand that the SaaS users 115 are not limited to the three SaaS users 115 shown in this figure. In some embodiments, user management (for both SaaS users 115 and developer users 120) is virtually unlimited for highly scalable large deployments of the conversational and live interactions development and marketplace distribution system 100.

In some embodiments, SaaS users 115 connect to the conversational and live interactions development and marketplace distribution engine 105 via the SaaS interface 110. In some embodiments, the SaaS interface 110 provides a web application that includes at least three interface views with tools and applications that allow the SaaS users 115 to build and publish their live interaction plug-ins for the channels of their choice. In some embodiments, at least one of the interface views provided by the SaaS interface 110 is a channel setup and registry interface view 111. In some embodiments, another interface view provided by the SaaS interface 110 is a live interaction as a plug-in (services) interface view 112. Yet another interface view provided by the SaaS interface 110 of some embodiments is an event monitor and analysis interface interface view 113. The conversational and live interactions development and marketplace distribution engine 105 is described in further detail below, by reference to FIG. 2.

Third party integration/plug-ins are from the developer users 120 who access the conversational and live interactions development and marketplace distribution engine 105 by way of the developer/API interface 122. In some embodiments, a development platform is available for the developer users 120 via the developer/API interface 122. In some embodiments, the development platform is available to developer users 120 with a developer account that is registered with the conversational and live interactions development and marketplace distribution system 100. In some embodiments, developer users 120 can use the development platform to build and publish third party integration plug-ins. In some embodiments, the developer-built and published third party integration plug-ins are deployed to live operations through the development platform. Furthermore, in some embodiments, the live interaction plug-ins built and published by the developer users 120 are made available for distribution in the marketplace.

In some embodiments, the standard templates and models functions chat flow 125 is used in the system to provide a common standard for live interaction plug-ins that are responsive in realtime to events and activities over a multitude of channels. In some embodiments, the marketplace bridges the developer/API interface 122 with the SaaS interface 110 by parsing submitted components and micro services to standard templates and models 125, so that the SaaS interface 110 can consume them, while the chat flow component 125 preserves the state of interaction (conversation).

In some embodiments, the channel listener and channel template parser 130 runs a channel agnostic model to serve and preserve the state of interactions regardless of the channel. In some embodiments, the state of interaction (conversation) is preserved via its the chat flow component instant memory 125, in order to accomplish a meaningful business objective through a live interaction.

The audience chat bot consumer users 135 shown in this figure include audience chat bot consumer user 135A (SMS interaction), audience chat bot consumer user 135B (Messenger interaction), audience chat bot consumer user 135C (Messenger interaction), audience chat bot consumer user 135D (Twitter interaction), audience chat bot consumer user 135E (live interaction), audience chat bot consumer user 135F (SMS interaction), audience chat bot consumer user 135G (live interaction), audience chat bot consumer user 135H (live interaction), and audience chat bot consumer user 135I (phone or voice interaction).

The audience chat bot consumer users 135 are premised on a business or entity having a proper SaaS user account and selecting one or more channels over which to engage in live interaction via live interactive plug-ins or integrations. Then, after a SaaS user account is created on the SaaS platform of the conversational and live interactions development and marketplace distribution cloud service 200 of the conversational and live interactions development and marketplace distribution system 100, a user of the business account may select, configure, and/or set up each and all the possible channels the business would utilize to communicate externally with the outside world. Examples of channels that a business may use to communicate externally include, without limitation, Facebook, LinkedIn, Instagram, Twitter, email, SMS, other private messaging channels, etc.

The databases 140 shown in this figure include a SaaS user database 140A, a state of interaction database 140B, a templates database 140C comprising a library of interaction templates and frameworks, a channel-service mapping database 140D comprising a mapping model and a unique service-channel-correspondence identifier ("service-channel-correspondence ID"), and an events database 140E with the events that are captured by the conversation engine being stored in events database 140E and shared with SaaS, such that full reports of events/activities as well as live analysis are available to SaaS users 115 via channels' dashboard or services dashboard. The five databases 140 shown in this figure are not intended to be limiting, but instead are shown for exemplary purposes only. A person of ordinary skill in the relevant art would appreciate and understand that the number of databases, data repositories, or data storages that may be deployed for any particular conversational and live interactions development and marketplace distribution system is not limited to only five databases, but instead, may include more databases or may include less databases, as needed for the particular conversational and live interactions development and marketplace distribution system deployment.

In some embodiments of the conversational and live interactions development and marketplace distribution system 100, live interactions work as pop-up experiences that provide instant connectivity with members of an audience who are the intended target users or visitors of the shared content, on social media or a messaging channel. The purpose of such live interaction pop-ups is to spark audience engagement and create momentum in a live conversation with members of the engaged audience to achieve a business goal, whether that be making an appointment, selling a product, or collecting audience information for re-targeting at a later time. In some embodiments, the conversational and live interactions development and marketplace distribution system 100 does this through its channel-agnostic approach that allows for the creation of momentum as the first responder agent, whether the first responder agent is that of an automated response or human-enabled chat, while supporting a completely stateful sequence of activities during all engagements.

Figure 2:
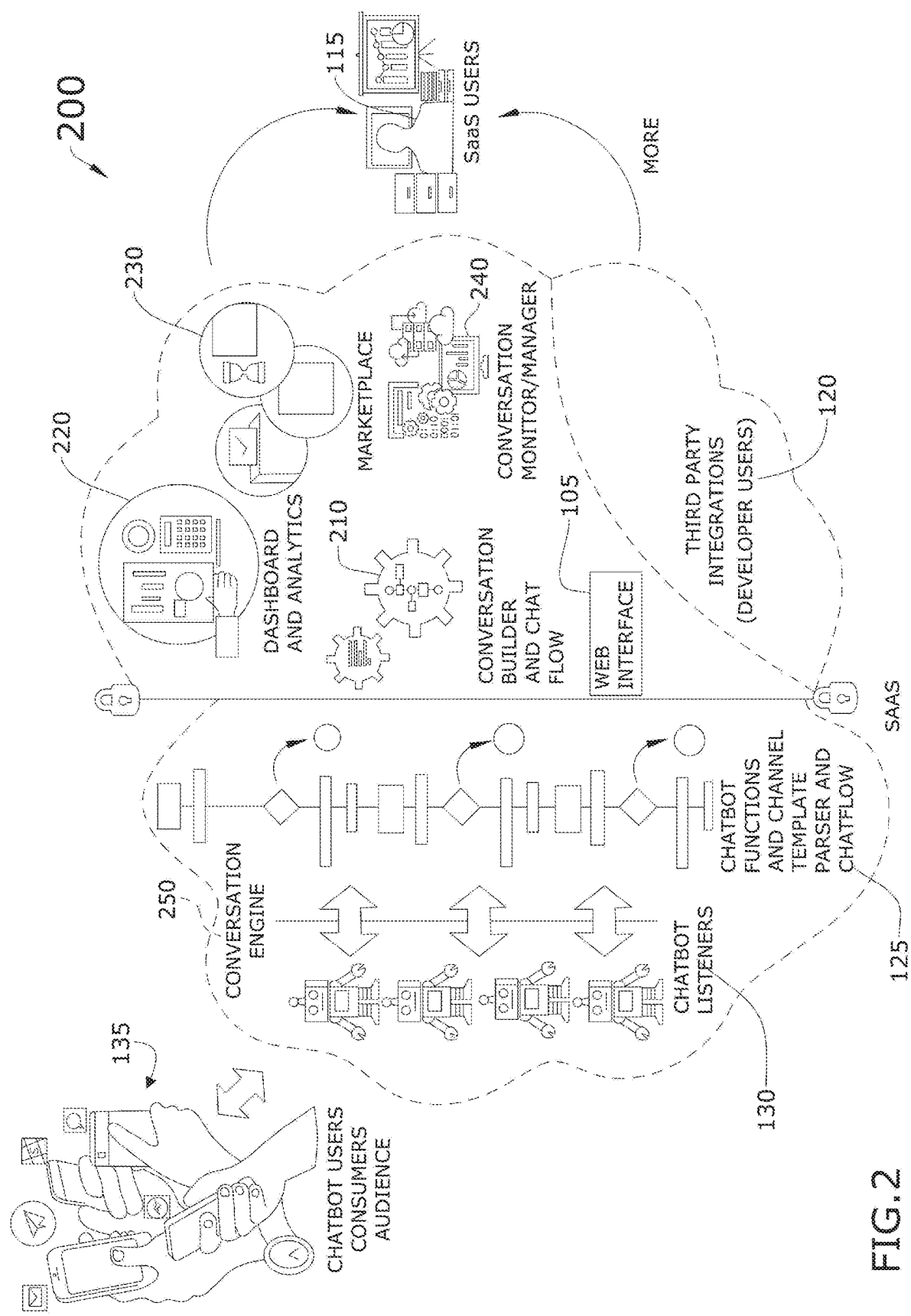
FIG. 2 conceptually illustrates a conversational and live interactions development and marketplace distribution cloud service in some embodiments provided by the conversational and live interactions development and marketplace distribution system.

Turning to another example, FIG. 2 conceptually illustrates a conversational and live interactions development and marketplace distribution cloud service 200 provided by the conversational and live interactions development and marketplace distribution system 100 described above by reference to FIG. 1. As shown in this figure, the conversational and live interactions development and marketplace distribution cloud service 200 includes several live interaction plug-in creation and monitoring tools on a right side of a conceptual software as a service (SaaS) cloud, and several chat-bot listeners and functions on a left side of the conceptual SaaS cloud. The several live interaction plug-in creation and monitoring tools on the right side of the SaaS cloud include a conversation builder and chat flow 210, a dashboard and analytics module 220, a marketplace 230, and a conversation monitor or manager 240, which are part of the conversational and live interactions development and marketplace distribution engine 105 described above by reference to FIG. 1 and are accessible to SaaS users 115 and third party integration developer users 120 via a web interface of the conversational and live interactions development and marketplace distribution engine 105, such as SaaS interface 110 and developer/API interface 122.

Additionally, the several chat-bot listeners and functions on the left side of the SaaS cloud for the conversational and live interactions development and marketplace distribution cloud service 200 are part of a conversation engine 250. The conversation engine 250 includes the chatbot listeners 130 and the chatbot functions and channel template parser and chat flow 125 described above by reference to FIG. 1. As noted above, the chatbot listeners 130 and chatbot functions and chat flow 125 capture all events and activities from live interaction plug-ins associated with the devices of the audience chat bot consumer users 135. In some embodiments, the conversation engine 250 listens for events/actions that suggest possible audience engagement via the chatbot listeners 130 and automatically posts interactive responses to audience engagement (detected by the events/actions) for each registered channel by using the channel template parser to run a channel agnostic model and serve and preserve the state of interactions regardless of the channel. In some embodiments, the state of interactions (conversation) is preserved by the an instant memory component or module of the chatbot functions and chat flow 125 which allows the conversation engine 250 to seamlessly engage audience over any pause/break period of time or other interruptions that may occur during live interactive engagement with audience. Also, the conversation engine 250 is associated with the conversation monitor/manager 240 and the dashboard/analytics 220, thereby allowing SaaS users 115 to monitor live interaction plug-in campaign deployments.

II. Event Monitoring and Analytics

In some embodiments, the conversational and live interactions development and marketplace distribution system allows for automatic publishing of content to one or more of these channels. The automatic publishing of content supports both organic posting and sponsored content. In some embodiments, the conversational and live interactions development and marketplace distribution system constantly listens to these channels and collects all events and activities by the audiences over these channels. In some embodiments, the collected events and activities are reported on by an event monitoring and analytics engine of the conversational and live interactions development and marketplace distribution system. In some embodiments, the conversational and live interactions development and marketplace distribution system allows one to set an auto-response on conversation engine for each channel. In some embodiments, the auto-response is set once and the channel template parser of the conversational and live interactions development and marketplace distribution system manages cross-channel template translation.

Figure 3:
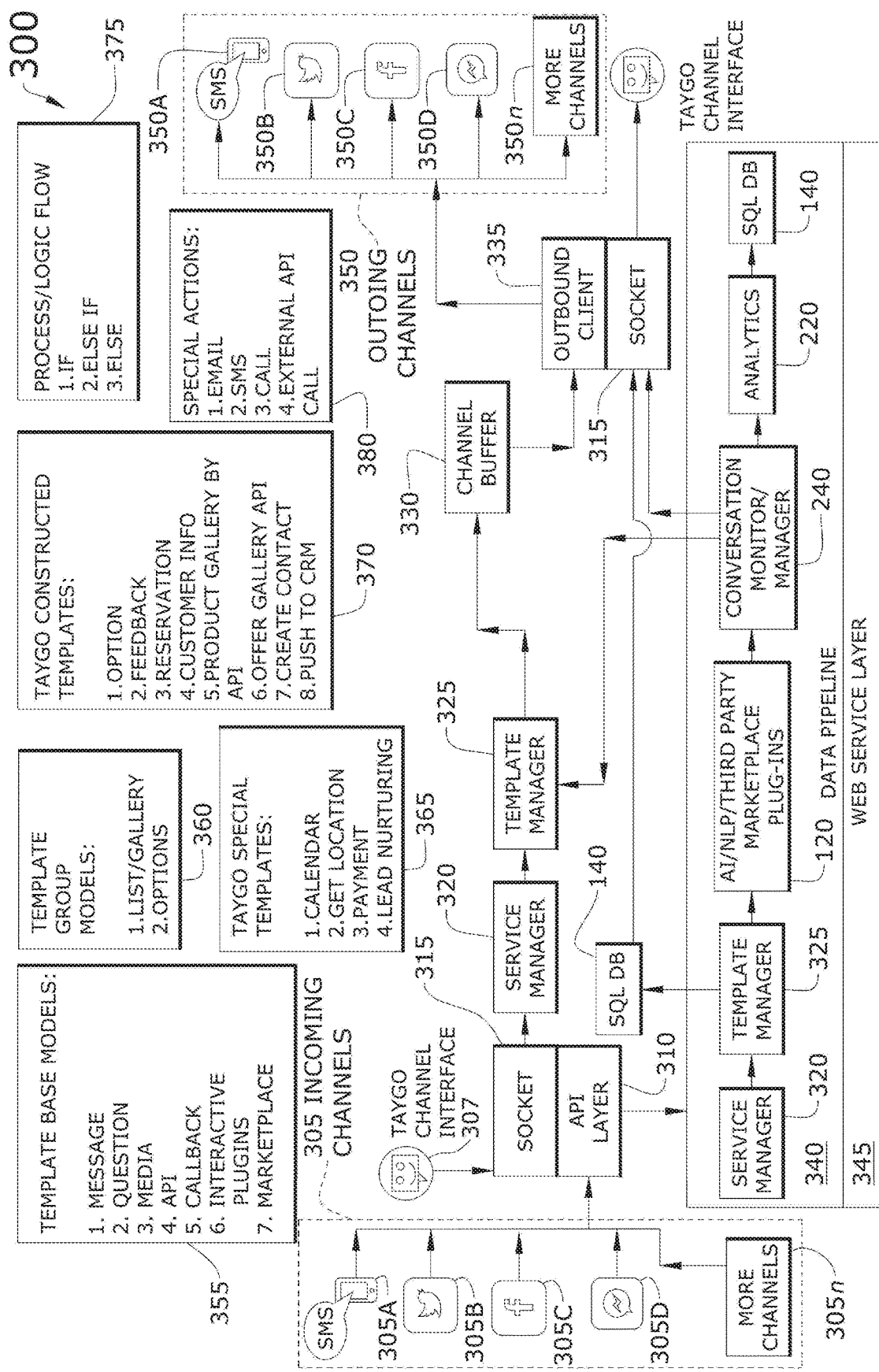
FIG. 3 conceptually illustrates an interaction flow and analysis process in some embodiments performed in connection with a conversation engine and several templates.

By way of example, FIG. 3 conceptually illustrates an interaction flow and analysis process 300 performed by an event monitoring and analytics engine in relation to several templates. As shown in this figure, the interaction flow and analysis process 300 includes a plurality of incoming channels 305, a channel interface 307 ("TAYGO" channel interface) of the event monitoring and analytics engine, API layer 310, socket 315, service manager 320, template manager 325, channel buffer 330, outbound client 335, a data pipeline 340, a web service layer 345, and a plurality of outgoing channels 350. In addition, the interaction flow and analysis process 300 performs some operations in relation to one or more templates, models, process/logic flow items, or special actions, including a plurality of template based models 355, a plurality of template group models 360, a plurality of special templates 365, a plurality of constructed templates 370, a plurality of process/logic flow items 375, and a plurality of special actions 380.

The plurality of incoming channels 305 includes incoming SMS channel 305A, incoming Twitter channel 305B, incoming Facebook channel 305C, incoming Messenger channel 305D, and more incoming channels 305n. The plurality of outgoing channels 350 corresponds to the plurality of incoming channels 305. Specifically, the plurality of outgoing channels 350 includes outgoing SMS channel 350A, outgoing Twitter channel 350B, outgoing Facebook channel 350C, outgoing Messenger channel 350D, and more outgoing channels 350n.

The data pipeline 340 of some embodiments includes service manager 320 transitioning to template manager 325. In some embodiments, template manager 325 interacts with SQL DB 140 and AI/NLP/third party marketplace plug-ins 120. In some embodiments, the AI/NLP/third party marketplace plug-ins 120 interacts with a conversation monitor/manager 240. The conversation monitor/manager 240 interacts with the template manager 325, the socket 315, and analytics 220, which thereafter leads to saving and storing all data in the SQL DB 140.

In some embodiments, the interaction flow and analysis process 300 performed by the event monitoring and analytics engine in relation to the several templates starts by an action or event initiated by a user of a device along a particular incoming channel among the plurality of incoming channels 305. In some embodiments, the TAYGO channel interface 307 opens a socket 315 connection as the action or event initiated along the particular incoming channel opens the API layer 310 for processing of the action or event along the channel. The initiated action or event is processed by the API layer along the data pipeline 340 while the socket 315 transitions to elements in step-wise fashion that corresponds to the data pipeline 340, all of which are within the same web service layer 345. Thus, when the API layer 310 transitions to the service manager 320 associated with the particular channel, the socket 315 also transitions to the service manager 320. Upon initiating the appropriate service manager 320, the API layer 310 calls the template manager 325 to retrieve a specific base model from the plurality of template base models 355. Contemporaneously, the socket 315 then requests the template manager 325 to open the specific base model, thereby allowing the API layer 310 to use the template manager 325 in the data pipeline 340 to retrieve the specific base model from the SQL DB 140. The template manager 325 in the data pipeline 340 then loads the AI/NLP/third party marketplace plug-in(s) 120 from any of the plurality of template group models 360, the plurality of special templates 365, the plurality of constructed templates 370, the process/logic flow items 375, and the plurality of special actions 380, and sets the conversation monitor/manager 240 to be active in relation to the particular channel. The conversation monitor/manager 240 may request one or more template(s) from the template manager 325 related to the socket 315. The template(s) are used to provide the appropriate live interaction response to the triggering event/action from the particular incoming channel 305, and is thereafter provided to the channel buffer 330 and outbound client 335. The outbound client 335 identifies the outgoing channel 350 which corresponds to the particular incoming channel 305, thus providing the real-time live interactive response to the device of the particular channel 305.

In some embodiments, the conversational and live interactions development and marketplace distribution system includes a library of live interaction pop-ups of which users can implement the call-to-action strategies per channel. These pop-ups include components such as a chatbot response, live chat engagement, video streaming or a set of instant apps (such as "Scheduler," "Buy Now," "Static Form components," etc.). These pop-ups appear instantly in an in-app view in any audience engagement on social media networks or messaging channels and are designed to accomplish one goal each. They are all connected at the backend which is a requirement to be able to preserve the state of audience engagement and the conversation, from the minute audience is engaged all the way to when conversion occurs, which is called the lead life cycle. Since the conversational and live interactions development and marketplace distribution system supports a stateful sequence of activities, the conversational and live interactions development and marketplace distribution system provides full traceability throughout the lead life cycle (otherwise referred to as a "live lead").

The event monitor engine records every single lead action while interacting with live interaction pop-ups. The conversation engine creates a thread ID once the first live interaction occurs and maintains it throughout the lead life cycle. All of these pop-ups feed into the same thread ID, hence, activities are traceable. The conversation engine can handle an automated or semi-automation conversation as the first responder strategy. A human agent can take over the conversation at any time using the live chat feature. The templates library provides instant chat action templates to expedite the process even for human agents. The lead can be handed over from one pop-up to another with a full activity history preserved in the background.

III. Example Functions and Inputs of a Conversational and Live Interactions Development and Marketplace Distribution Cloud Service User Interface Since the conversational and live interactions development and marketplace distribution system supports a community based development platform, the conversational and live interactions development and marketplace distribution system also enables external developers to create and deploy their custom live interaction plug-ins. The development platform along side the marketplace provide all required tools to facilitate that. Once a custom plug-in is deployed on development platform, it becomes available through the marketplace to business users of the SaaS interface which can pick and plug them into their operations the same way they do with off-the-shelf micro services and plug-ins. Any or all of these customizations can include one or more of NLP plug-ins, AI add-ons, state-sensitive chat flows, custom workflows (or processes) and data integration.

Figure 4:
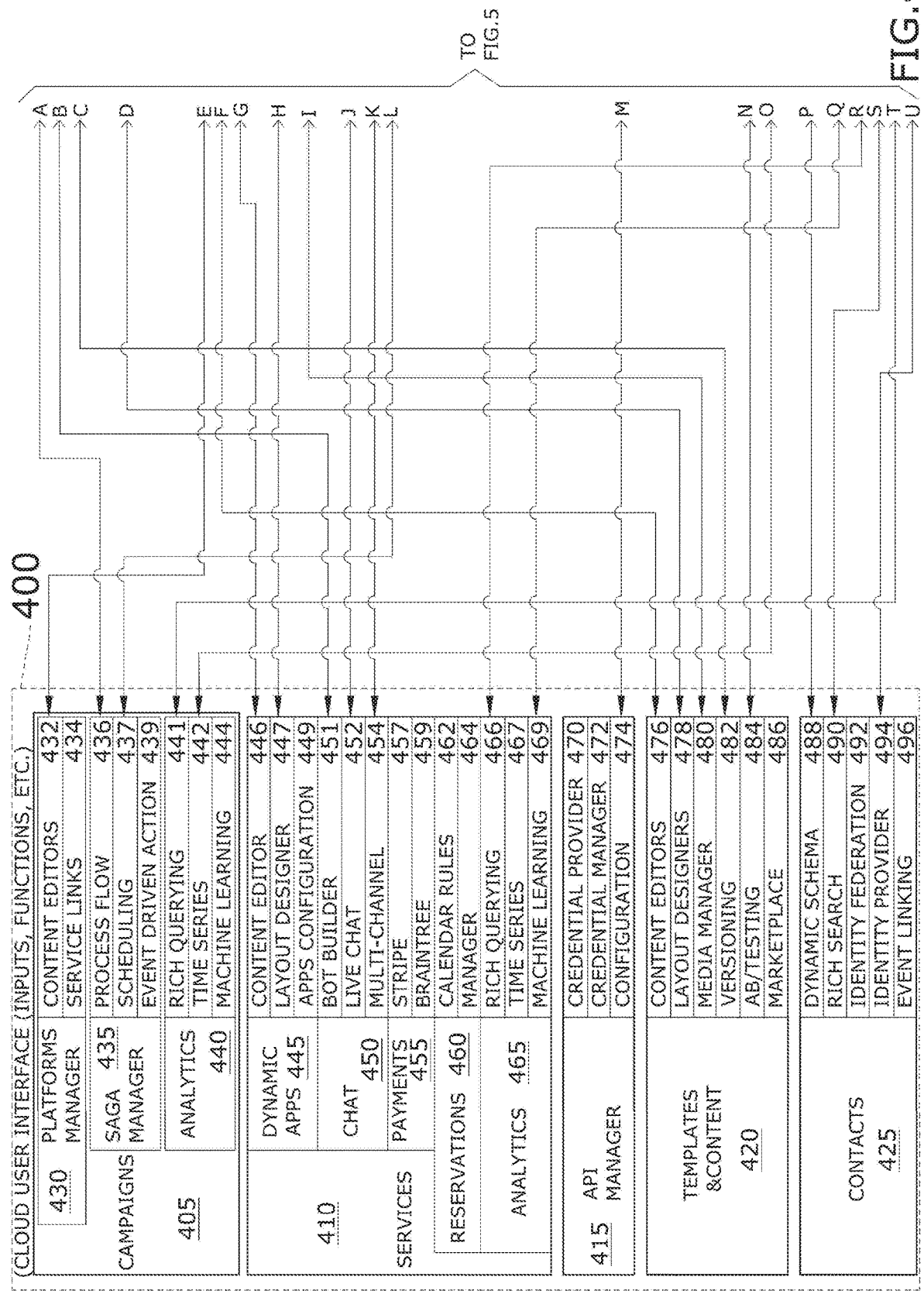
FIG. 4 conceptually illustrates inputs and functions of a cloud user interface in some embodiments of the conversational and live interactions development and marketplace distribution cloud service.
Figure 5:
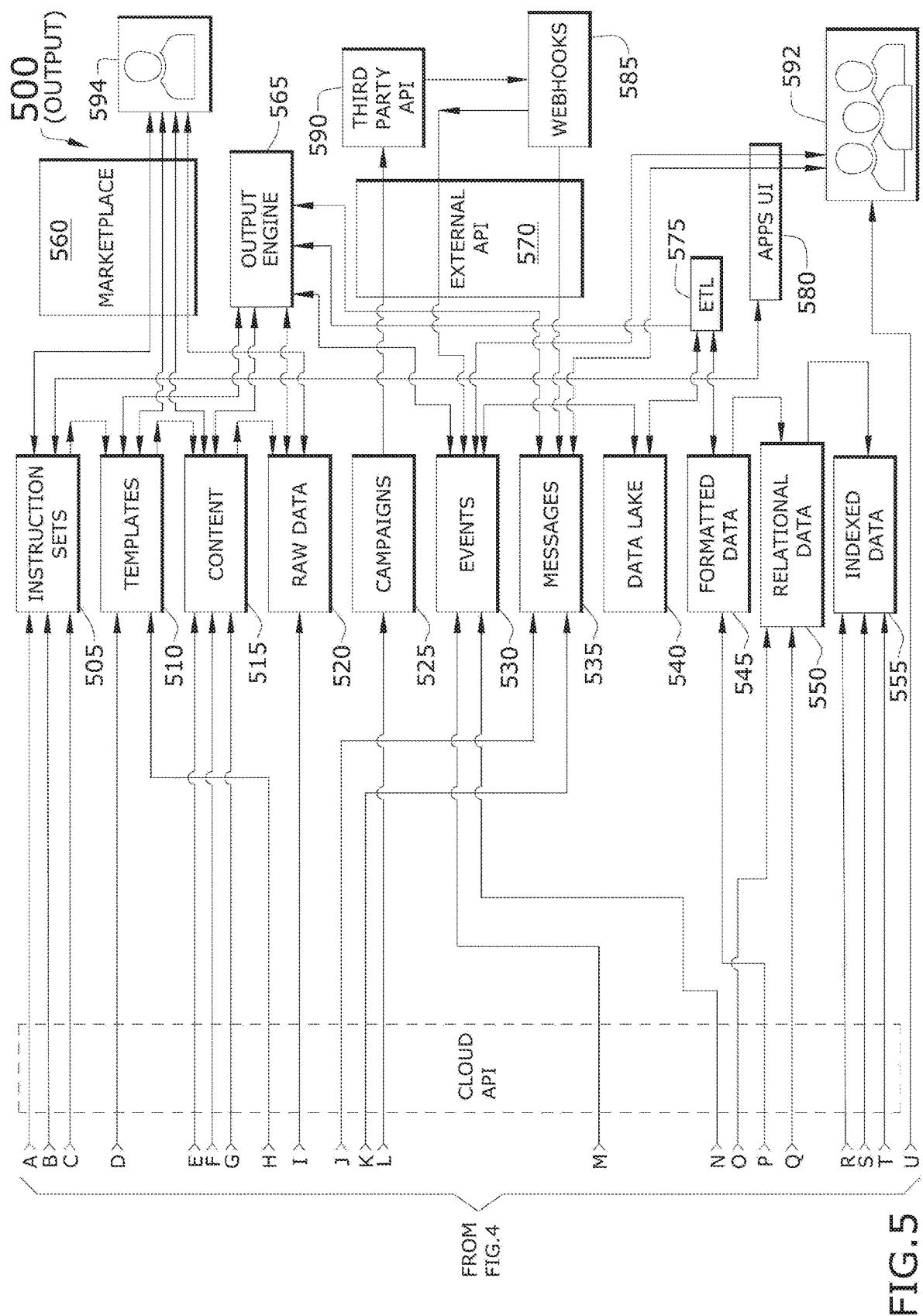
FIG. 5 is a continuation of FIG. 4 and conceptually illustrates a set of cloud user interface output and outcomes of the inputs and functions of the cloud user interface shown in FIG. 4.

By way of example, FIGS. 4 and 5 conceptually illustrate a cloud user interface chart of the conversational and live interactions development and marketplace distribution cloud service. Looking first to FIG. 4, the cloud user interface chart 400 elaborates on inputs, functions, etc., related to at least one of a developer interface and a SaaS user interface for the conversational and live interactions development and marketplace distribution cloud service. As shown in this figure, the cloud user interface chart 400 includes five major cloud user interface ("UI") categories, namely, a campaigns UI 405 category, a services UI 410 category, an API manager UI 415 category, a templates and content UI 420 category, and a contacts UI 425 category.

In some embodiments, the campaigns UI 405 category includes several campaigns UI sub-categories, including a platforms manager 430 sub-category, a saga manager 435 sub-category, and a campaign analytics 440 sub-category. The platforms manager 430 sub-category includes content editors 432 and service links 434. The saga manager 435 sub-category includes process flow 436, scheduling 437, and event driven action 439. The campaign analytics 440 sub-category includes campaign analytics rich querying 441, campaign analytics time series 442, and campaign analytics machine learning 444. In some embodiments, the campaigns UI 405 category relates to campaign scenarios in which content is built or generated with editors for many of the channels over which businesses may launch their campaigns and versioning and/or A/B testing is made available to SaaS account users. From the campaigns UI 405 category, content is sent to and run directly or by way of third party APIs for delivery to consumer users (such as the chatbot users/consumers/audience 135 described above by reference to FIGS. 1 and 2), thereby allowing consumers to interact, produce activities, and trigger events. webhooks are incorporated for campaigns via the campaigns UI 405 category to listen for events or activities. webhooks allow for mass/aggregate storage of events and activities in data lake (one or more data repositories) and are processed in the ETL pipeline, which includes formatting and storage and in which analytics and indexes are built. webhooks can also produce event driven actions. In addition, an output engine associated with the campaigns UI 405 category determines next steps to perform based on instruction sets.

In some embodiments, the services UI 410 category includes several services UI sub-categories, including a dynamic apps 445 sub-category, a chat 450 sub-category, a payments 455 sub-category, a reservations 460 sub-category, and a service analytics 465 sub-category. The dynamic apps 445 sub-category includes dynamic apps content editors 446, a dynamic apps layout designer 447, and dynamic apps configuration 449. The chat 450 sub-category includes a chat bot builder 451, live chat 452, and multi-channel 454. The payments 455 sub-category includes a Stripe payments entry 457 and a Braintree payments entry 459. The reservations 460 sub-category includes calendar rules 462 and a reservations manager 464. The service analytics 465 sub-category includes service analytics rich querying 466, service analytics time series 467, and service analytics machine learning 469. In some embodiments, the services UI 410 category relates to services such as landing page with apps built, chat bots built with instruction sets, webhooks that listen for messages, and landing page that produces events (such as mass/aggregate storage in data lake, processing along ETL pipeline, data driven events, and the output engine for next steps, etc.). The services UI 410 category handing of the landing page with apps built includes responsive layout design, multiple content models, as well as apps settings and management (e.g., payments, reservations, chat, etc.). The services UI 410 category handing of the chat bot built with instruction sets includes a chat flow manager, third party API support, natural language processing (NLP) if needed, and live chat with template-based messaging. The services UI 410 category handing of the webhooks that listen for messages includes messages being parsed and translated to standard language, responses made via APIs, NLP, and/or bot instruction sets, multi-channel support, live chat and notifications available when needed, and support of CRM via threading and assignment.

In some embodiments, analytics and ML for campaigns and services are supportive of a consumer model that derives associations and cluster data, supports pattern recognition and interaction path finding with respect to template models, and generates predictions for interactions and behaviors. Instruction sets, templates, content, and raw data in view of the marketplace are involved in successful campaigns and services (e.g., as determined by aggregate, statistical, and analytics data) and can be packaged for marketplace use, and further allows for customization and property inheritance and requests for live editing to one's own data (directly or via contractors).

In some embodiments, the API manager UI 415 category includes a plurality of API manager UI sub-categories. In some embodiments, the plurality of API manager UI sub-categories includes a credential provider 470, a credential manager 472, and configuration 474 for the API manager UI 415.

In some embodiments, the templates and content UI 420 category includes a plurality of templates and content UI sub-categories comprising templates and content content editors 476, templates and content layout designers 478, a templates and content media manager 480, templates and content versioning 482, templates and content AB/testing 484, and a templates and content marketplace 486.

In some embodiments, the contacts UI 425 category includes a plurality of contacts UI sub-categories. In some embodiments, the plurality of contacts UI sub-categories includes a contacts dynamic schema 488, a contacts rich search 490, contacts identity federation 492, a contacts identity provider 494, and contacts event linking 496.

In some embodiments, the inputs, functions, and other interface sub-category options among the five major cloud UI categories shown in the cloud user interface chart 400 of FIG. 4 are related to specific items, elements, etc., as shown in FIG. 5, which conceptually illustrates a set of cloud user interface output and outcomes 500 of the items in the cloud user interface chart 400. In some embodiments, the set of cloud user interface output and outcomes 500 includes an instruction sets 505 output point, a templates 510 output point, a content 515 output point, a raw data 520 output point, a campaigns 525 output point, an events 530 output point, a messages 535 output point, a data lake 540 output point, a formatted data 545 output point, a relational data 550 output point, an indexed data 555 output point, a marketplace 560, an output engine 565, an external API 570, ETL data pipeline 575 (such as the data pipeline 340 described above by reference to FIG. 3), apps UI 580, webhooks 585, third party API 590, a target group 592, and a target user 594.

In describing the set of cloud user interface output and outcomes 500, reference is made to several of the items in the cloud user interface chart 400 of FIG. 4, where inputs from the items in the cloud user interface chart 400 are directed across lettered arrows to corresponding output points among the set of cloud user interface output and outcomes 500 in FIG. 5. Starting with FIG. 5, lettered arrows 'A', 'B', and 'C' are directed to the instruction sets 505 output point. The lettered arrows 'A', 'B', and 'C' originate from input of corresponding items in the cloud user interface chart 400 of FIG. 4. The input of the corresponding items triggers the instruction sets 505 output point to run computer readable instruction sets on a processor of a computing device that carry out the functions or operations of the corresponding items. Specifically, lettered arrow 'A' is associated with input from the process flow 436 item of the saga manager 435 sub-category of the campaigns UI 405 category, lettered arrow 'B' is associated with input from the bot builder 451 item of the chat 450 sub-category of the services UI 410 category, and lettered arrow 'C' is associated with input from the versioning 482 item of the templates and content UI 420 category.

Moving on, the lettered arrows 'D' and 'H' are directed to the templates 510 output point of the set of cloud user interface output and outcomes 500 shown in FIG. 5. The lettered arrows 'D' and 'H' originate from input of corresponding items in the cloud user interface chart 400 of FIG. 4, which triggers the templates 510 output point to create, load, use, or save templates in relation to the corresponding items of the cloud user interface chart 400. Specifically, lettered arrow 'D' is associated with input from the layout designers 478 item of the templates and content UI 420 category, while lettered arrow 'H' is associated with input from the layout designer 447 item of the services dynamic apps 445 sub-category of the services UI 410 category in the cloud user interface chart 400 of FIG. 4.

In some embodiments, the lettered arrows 'E', 'F', and 'G' are directed to the content 515 output point of the set of cloud user interface output and outcomes 500 shown in FIG. 5. The lettered arrows 'E', 'F', and 'G' originate from input of corresponding items in the cloud user interface chart 400 of FIG. 4, which triggers the content 515 output point to process content in relation to the corresponding items of the cloud user interface chart 400. Specifically, lettered arrow 'E' is associated with input from the content editors 432 item of the platforms manager 430 sub-category of the campaigns UI 405 category, lettered arrow 'F' is associated with input from the content editors 476 item of the templates and content UI 420 category, and lettered arrow 'G' is associated with input from the content editor 446 item of the services dynamic apps 445 sub-category of the services UI 410 category in the cloud user interface chart 400 of FIG. 4.

Turning back to FIG. 5, the lettered arrow 'I' is directed to the raw data 520 output point of the set of cloud user interface output and outcomes 500 and originates from input of the media manager 480 item of the templates and content 420 category in the cloud user interface chart 400 of FIG. 4.

In some embodiments, the lettered arrow 'L' is directed to the campaigns 525 output point of the set of cloud user interface output and outcomes 500 and originates from input of the scheduling 437 item of the saga manager 435 sub-category of the campaigns 405 category in the cloud user interface chart 400 of FIG. 4.

Continuing on, the lettered arrows 'M' and 'N' are directed to the events 530 output point of the set of cloud user interface output and outcomes 500 shown in FIG. 5. The lettered arrows 'M' and 'N' originate from input of corresponding items in the cloud user interface chart 400 of FIG. 4, which triggers the events 530 output point to listen for events and activities as directed by the corresponding items of the cloud user interface chart 400. Specifically, lettered arrow 'M' is associated with input from the configuration 474 item of the API manager UI 415 category, while lettered arrow 'N' is associated with input from the AB/testing 484 item of the templates and content UI 420 category in the cloud user interface chart 400 of FIG. 4.

Turning back to FIG. 5, the lettered arrows 'J' and 'K' are directed to the messages 535 output point of the set of cloud user interface output and outcomes 500. The lettered arrows 'J' and 'K' originate from input of corresponding items in the cloud user interface chart 400 of FIG. 4, which triggers the messages 535 output point to listen for and send messages as directed by the corresponding items of the cloud user interface chart 400. Specifically, lettered arrow 'J' is associated with input from the live chat 452 item of the chat 450 sub-category of the services UI 410 category in the cloud user interface chart 400. Similarly, lettered arrow 'K' is associated with input from the multi-channel 454 item of the chat 450 sub-category of the services UI 410 category in the cloud user interface chart 400 of FIG. 4.

In some embodiments, the lettered arrow 'P' is directed to the formatted data 545 output point of the set of cloud user interface output and outcomes 500 and originates from input of the dynamic schema 488 item of the contacts 425 category in the cloud user interface chart 400 of FIG. 4.

In some embodiments, the lettered arrows 'O' and 'Q' are directed to the relational data 550 output point of the set of cloud user interface output and outcomes 500. The lettered arrows 'O' and 'Q' originate from input of corresponding items in the cloud user interface chart 400 of FIG. 4. Specifically, lettered arrow 'O' is associated with input from the time series 442 item of the analytics 440 sub-category of the campaigns UI 405 category and lettered arrow 'Q' is associated with input from the machine learning 469 item of the analytics 465 sub-category of the services UI 410 category in the cloud user interface chart 400 of FIG. 4.

In some embodiments, the lettered arrows 'R', 'S', and 'T' are directed to the indexed data 555 output point of the set of cloud user interface output and outcomes 500 shown in FIG. 5. The lettered arrows 'R', 'S', and 'T' originate from input of corresponding items in the cloud user interface chart 400 of FIG. 4, where the indexed data 555 output point performs data indexing operations in relation to the corresponding items of the cloud user interface chart 400. Specifically, lettered arrow 'R' is associated with input from the rich querying 466 item of the analytics 465 sub-category of the services UI 410 category, lettered arrow 'S' is associated with input from the rich search 490 item of the contacts UI 425 category, and lettered arrow 'T' is associated with input from the rich querying 441 item of the analytics 440 sub-category of the campaigns UI 405 category in the cloud user interface chart 400 of FIG. 4.

In some embodiments, the lettered arrow 'U' is directed to the target group 592 (not via the cloud API, but directly) of the set of cloud user interface output and outcomes 500 and originates from input of the identity provider 494 item of the contacts 425 category in the cloud user interface chart 400 of FIG. 4.

In some embodiments, inputs to and outputs from the output points are made in relation to destination outputs and outcomes in the set of cloud user interface output and outcomes 500. Specifically, the instruction sets 505 output point receives input from and renders output to apps UI 580 and the target user 594. The instruction sets 505 output point also outputs to the templates 510 output point. The templates 510 output point receives input from the instruction sets 505 output point, receives input from and sends output to the output engine 565 and the target user 594 by way of the marketplace 560, and outputs to the content 515 output point. Similarly, the content 515 output point receives input from the templates 510 output point, receives input from and sends output to the output engine 565 and the target user 594 by way of the marketplace 560, and outputs to the raw data 520 output point. The raw data 520 output point receives input from the content 515 output point and receives input from and sends output to the output engine 565 and the target user 594 by way of the marketplace 560.

In some embodiments, the campaigns 525 output point sends output to the third party API 590 by way of the external API 570. The third party API 590 sends output to webhooks 585, which itself outputs to the events 530 output point and the messages 535 output point by way of the external API 570. Both the events 530 output point and the messages 535 output point receive input from and send output to the output engine 565 and the target group 592, and the data lake 540 output point, while receiving input from webhooks 585. The events 530 output point also receives input from and sends output to the data lake 540 output point. The data lake 540 output point receives input from and sends output to the events 530 output point and ETL data pipeline 575, which itself also sends input to the output engine 565, while also sending input to and receiving output from the formatted data 545 output point. The formatted data 545 output point sends input to and receives output from ETL data pipeline 575, while also sending formatted input to the relational data 550 output point. The relational data 550 output point receives input from the formatted data 545 output point and sends output to the indexed data 555 output point.

To make the conversational and live interactions development and marketplace distribution system of the present disclosure, there are five major software pieces, including a library of interaction templates and frameworks, channels setup and monitoring, conversation engine, and interaction flows and analysis.

The library of templates and frameworks is a library of JSON objects and applicable rules in standard formats that are provided in two ways: SaaS interface and developer interface. The SaaS interface is an interaction (conversation) builder web user interface that is code-free with a point-and-click visual experience. By using its visual elements, users can build live interaction services and register them to the conversation engine. Through the developer interface, users can upload their custom JSON object compatible with standards to automatically create and register services to the conversation engine. Registering to the conversation engine is required because conversation engine is the main connector of the interactive services with registered communication channels.

Users register communication channels with the conversation engine via the channel setup and registry service on the SaaS interface. Channel setup and registry is a service in the cloud that allows for registering channels to listener services by the credential details such as App ID and App Secret and authentication profile. These credential details are provided by social media apps or messaging channels developer center.

IV. Examples of Conversational and Live Interactions Development and Marketplace Distribution System Runtime Processes In some embodiments, interactive services respond to activities and events that occur on registered channels. The SaaS interface provides a service settings interface to identify interactive services that correspond to registered channels and to associate the identified interactive services to the corresponding registered channels. The registry and association is handled by another software service called the registry manager which creates a unique service-channel-correspondence identifier ("service-channel-correspondence ID") that is used by the conversation engine to link each registered channel to each interactive service that corresponds to the registered channel. The conversation engine is a server-less and infinitely scalable software-as-a-service in the cloud that has live listeners that constantly listen to the activities and events of registered channels. When an occurrence of audience engagement is detected by a live listener on a registered channel, the conversation engine responds to the audience engagement with an instance of the corresponding interactive service registered to the channel. All audience activities captured by the conversation engine are fed into interaction flow and analysis. In some embodiments, the interaction flow and analysis is a server-less software service built-in to the cloud. In some embodiments, the conversation engine acts as a conductor of channel events and activities to interaction flows and analysis software via standard templates. Once an audience engagement is captured by the conversation engine, the interaction flow services creates a new thread object with a new thread ID. This thread ID is preserved throughout the life cycle of the interaction (or conversation). All interaction activities, whether they be single individual actions or multiple actions, are stored against this thread ID. Thus, the conversational and live interactions development and marketplace distribution system of some embodiments provides full traceability. Furthermore, in some embodiments, the interactive flow analysis consumes activities and actions captured by the conversation engine and generates live insights across the conversational and live interactions development and marketplace distribution system.

Figure 6:
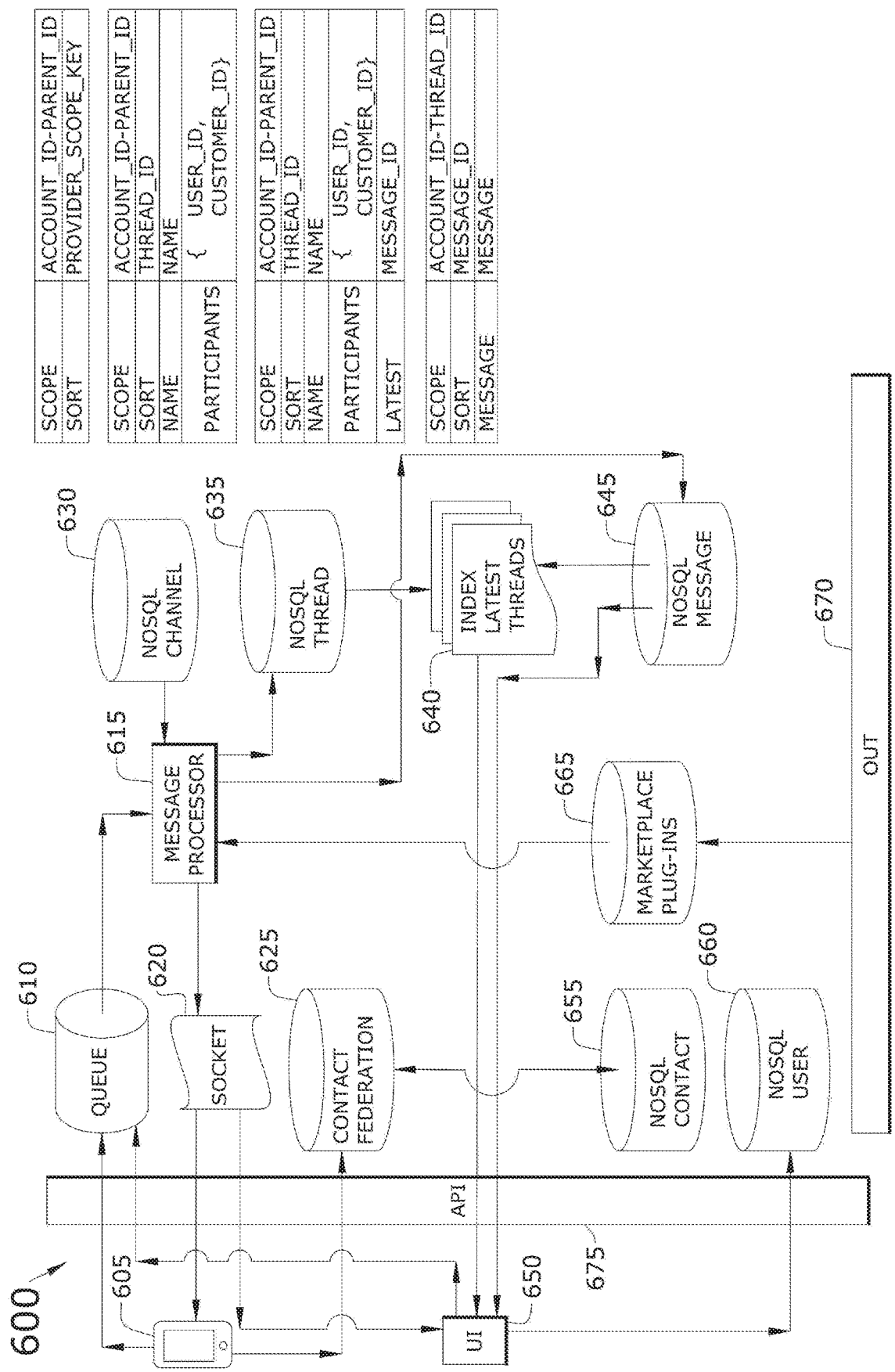
FIG. 6 conceptually illustrates a channel monitoring process in some embodiments.

By way of example, FIG. 6 conceptually illustrates a channel monitoring process 600. As shown in this figure, the channel monitoring process 600 includes computing device 605 (e.g., a "smartphone") which a user, with either a developer account or an SaaS account, operates to interact with the conversational and live interactions development and marketplace distribution system by way of an API. The computing device 605 starts by initiating an operation which is processed in a queue 610 repository and the user is checked in a federated contact database 625 via a contact record from a NoSQL contact database 655. The queue 610 provides information to the message processor 615 which then opens a socket 620 and loads a message from a NoSQL message database 645. The UI 650 is next, after the socket 620 is opened and the message from the NoSQL database 645. The UI 650 checks the user credentials and profile via a NoSQL user database 660. The marketplace plug-ins 665 are provided from out 670 and then transmitted to the message processor 615, which receives channel information from a NoSQL channel database 630 and retrieves information for a thread in a NoSQL thread database 635 based on one or more indexes of threads 640. The indexes of threads also provides input to the UI 650 while receiving input from the NoSQL message database 645, depending on the output of the message processor 615. Object parameters and associated parameter values are also shown to the side in FIG. 6.

Figure 7:
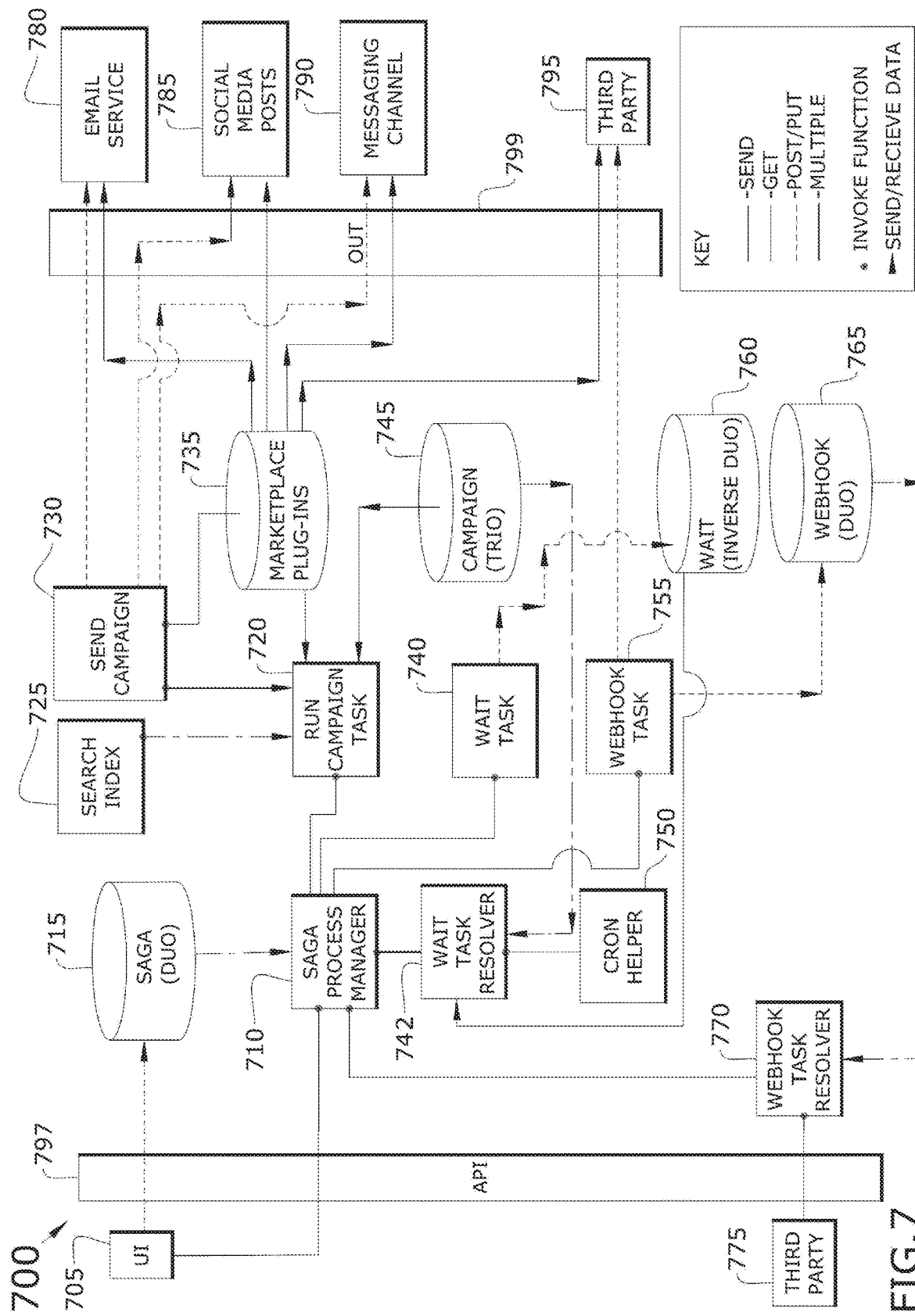
FIG. 7 conceptually illustrates a process for deploying live interaction plug-ins in some embodiments.

Now turning to another example, FIG. 7 conceptually illustrates a process for deploying live interaction plug-ins 700. As shown in this figure, the process for deploying live interaction plug-ins 700 includes a user interface (UI) 705, a saga process manager 710, a saga (duo) database 715, a run campaign task 720, a search index 725, a send campaign 730, a marketplace plug-ins database 735, a wait task 740, a wait task resolver 742, a campaign (trio) database 745, a CRON helper 750, a webhook task 755, a wait (inverse duo) database 760, a webhook (duo) database 765, a webhook task resolver 770, a third party 775, an email service 780, social media posts 785, a messaging channel 790, another third party 795, and out 799.

In some embodiments, the process for deploying live interaction plug-ins 700 starts with the UI 705 sending an instruction to the saga process manager 710 to invoke a function. Contemporaneously with the instruction to invoke the function, the UI 705 of some embodiments posts information in the saga (duo) database 715. In some embodiments, the saga process manager 710 sends an instruction to run a campaign task (at 720), as well as instructions for the wait task (at 740) and the webhook task (at 755).

In some embodiments, the process for deploying live interaction plug-ins 700 posts the search index (at 725) and sends the campaign (at 730) in relation to the running campaign task (at 720). In some embodiments, the marketplace plug-ins database 735 sends an instruction to invoke the function to send campaign (at 730), and also sends data out 799 to one or more of the email service 780, the social media posts 785, the messaging channel 790, and the other third party 795.

In some embodiments of the process for deploying live interaction plug-ins 700, the webhook task 755 is posted to the webhook (duo) database 765 and then to the webhook task resolver (at 770). In some embodiments of the process for deploying live interaction plug-ins 700, the third party 775 also invokes a function for the webhook task resolver 770 to resolve the webhook task. In some embodiments, the CRON helper 750 invokes a function to wait for the task resolver when the wait (inverse duo) database 760 sends the data. In some embodiments, the webhook task 755 is also posted to the other third party 795 over out 799. Furthermore, the campaign (trio) database 745 in some embodiments sends data to post the wait task resolver 742 and sends data to run the campaign task 720

To use the conversational and live interactions development and marketplace distribution system of the present disclosure, users (or customers) may start by creating one of two types of accounts: (i) SaaS account that grants access to SaaS interface and (ii) developer account that grants access API interface and development platform. SaaS account users would then select and register one or more channels, as noted above, in order to set up one or more live interactive services or plug-ins.

Thus, in some embodiments, the after the communication channels are registered, users can set up live interactive services. Examples of live interactive services include, without limitation, live chat, chatbot, auto-scheduler, landing page, video streaming, data streaming, etc. One of the best uses of live interactive services is as the call-to-action response for marketing operations on social media and messaging channels. Once live interactive services are set, users associate the services with registered channels. In some embodiments, the live interactive services are associated with registered channels in a registry manager view/ area of the SaaS. In some embodiments, the channel registry and service association is a mapping model that is shared between the SaaS and the conversation engine. SaaS users do not need to work directly with the conversation engine but it is useful to know how it works. In some embodiments, the conversation engine's listeners are constantly monitoring communication channels' activities and events. In some embodiments, the events that are captured by the conversation engine are stored in a database shared with SaaS. In some embodiments, reporting is available from the dashboard. Specifically, a user can access full reports of these activities/events as well as live analysis information and updates. In some embodiments, the live reporting and real-time analysis information and updates are available to SaaS users via the channels dashboard or services dashboard.

In some embodiments, each interactive service has multiple interfaces on SaaS, including at least a setup & edit interface, a dashboard interface, and a data interface. Information on any and all of these interfaces is routinely updated on a live basis. In case of chatbot or live chat services, users also get a live chat interface that creates a live channel to directly chat with the audience. The conversational and live interactions development and marketplace distribution system of some embodiments provides chat acceleration templates to send template messages with action buttons, thereby providing an easy way to minimize the efforts in chatting with the audience and in getting to results faster. Some examples of chat templates include, without limitation, "Make an Offer," "Grand Discount," "Make an Appointment," "Boy Now," etc. These example templates (and any other chat templates supported by embodiments of the conversational and live interactions development and marketplace distribution system) include (mostly) visual components, such as images or videos, perhaps also a message and a few action buttons to make the interactions faster. These action buttons can be developed as a custom button by external developers and plug into a conversation using the conversational and live interactions development and marketplace distribution system marketplace and also offers off-the-shelf templates and action buttons as well.

In some embodiments, the conversational and live interactions development and marketplace distribution system also gathers and analyzes data points through live interactions. These data points are used to detect behavioral patterns in audience engagement. The conversational and live interactions development and marketplace distribution system runs machine learning algorithms to use the accumulation of these patterns to create predictive models for future operations. In addition to off-the-self plug-ins and services, the conversational and live interactions development and marketplace distribution system provides a development platform to developer accounts. Developer accounts can create their custom live interactive plug-ins and deploy to the marketplace using standard templates and frameworks. Once these plug-ins are deployed, SaaS users have access to them on the marketplace center that is available to SaaS users. Developer user accounts also have access to the API developer interface which is an API that is configured to trigger and run services that are set by an SaaS user account, programmatically from inside other software applications.

Also, the conversational and live interactions development and marketplace distribution system of some embodiments can produce a sequence of related data points which together can produce behavioral patterns of audience response to social media advertising and marketing. These data points can be fed into two major products including (1) behavioral A/B testing modeling and automation (on social media and in general distributed channels) and (2) predictive models in analysis social media and messaging marketing paths characterized by content (e.g., image, video, etc.), channel (e.g., Facebook, LinkedIn, Messenger, SMS, etc.) and response type (e.g., call-to-action strategies such as Live Chat, Chatbot, Landing Pages, etc.).

V. Conversational and Live Interactions Development and Marketplace Distribution Process In some embodiments, the conversational and live interactions development and marketplace distribution system performs the conversational and live interactions development and marketplace distribution process to enhance customer engagement experiences by implementing lead/customer engagement and call-to-action strategy in social media advertisement, digital marketing, and customer success.

In some embodiments, the conversational and live interactions development and marketplace distribution process includes steps that are performed by one or more of the elements of the conversational and live interactions development and marketplace distribution system for channel registration, setting conversation and interaction rules in relation to the channels, providing the channel registry and rules to a realtime conversation interaction engine that monitors activities and events on the registered channels, posting interactive content in relation to detected activities and events on one or more registered channels, providing a public interface that is associated with at least one database, a set of native channels, and a set of third party channels, providing a marketplace for live interaction plug-ins, and analyzing all activities, events, and interactions over the registered channels.

Figure 8:
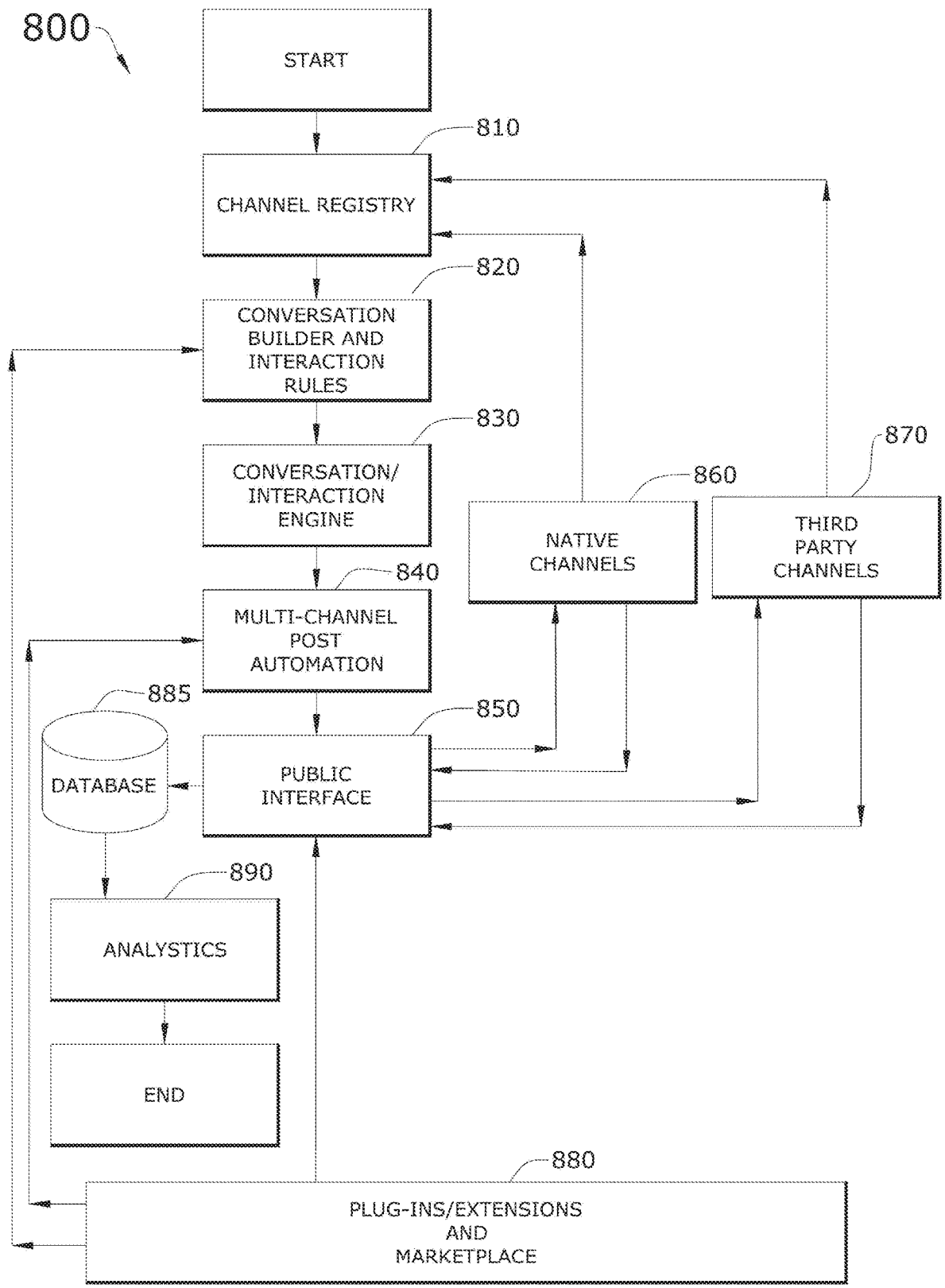
FIG. 8 conceptually illustrates a conversational and live interactions development and marketplace distribution process in some embodiments.

By way of example, FIG. 8 conceptually illustrates a conversational and live interactions development and marketplace distribution process 800. As shown in this figure, the conversational and live interactions development and marketplace distribution process 800 starts with channel registry (at 810). Next, the conversational and live interactions development and marketplace distribution process 800 transitions to operations for interacting with the conversation builder and configuring the interaction rules (at 820). In some embodiments, the registered channels and the conversation builder/interaction rules output are provided to the conversation/interaction engine (at 830) for real-time live interactions. Next, the conversational and live interactions development and marketplace distribution process 800 of some embodiments performs automated posting of interactive responses along multiple registered channels (at 840), which is performed in view of public interface (at 850) along both native channels (at 860) and third party channels (at 870) and as determined by one or more plug-ins or extensions from the marketplace (at 880).

In some embodiments, the conversation engine performs the automated posting of interactive responses for each registered channel by using the channel template parser to run a channel agnostic model and serve and preserve the state of interactions regardless of the channel. In some embodiments, the state of interactions (conversation) is preserved by the chat flow instant memory module for the conversation engine.

In some embodiments, when events and activities are triggered over the public interface (at 850), the conversational and live interactions development and marketplace distribution process 800 posts (at 885) the events/activities to a database 885 and provides the events/activities to analytics (at 890) for processing. Then the conversational and live interactions development and marketplace distribution process 800 ends.

In this way, the conversational and live interactions development and marketplace distribution process 800 provides an effective way to support a stateful sequence of activities in relation to live chatbot interactions with consumers/audiences over one or more channels in order to accomplish meaningful business objectives.

The above-described embodiments of the invention are presented for purposes of illustration and not of limitation.

VI. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
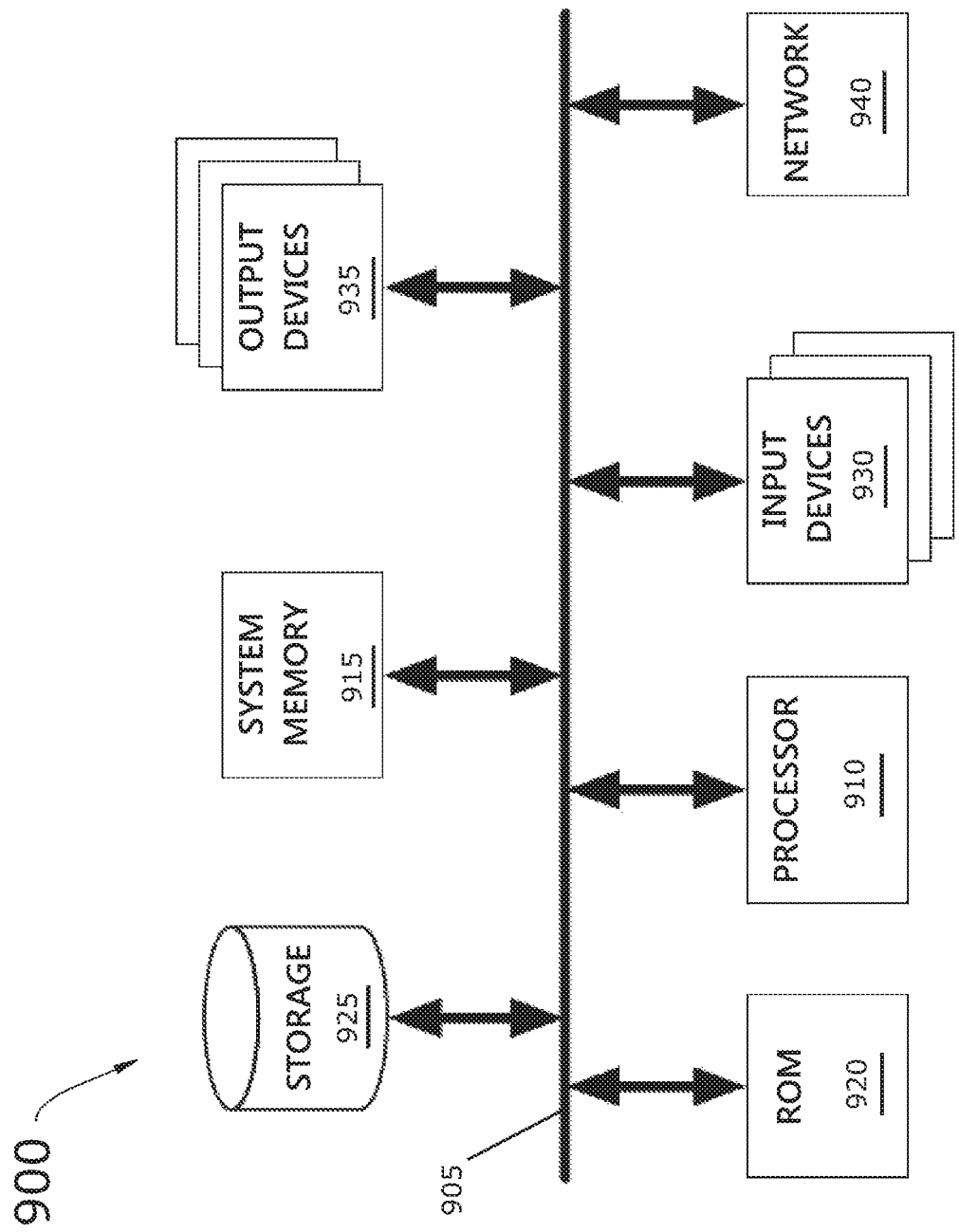
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer, phone, PDA, or any other sort of electronic device. Such an electronic system includes various types of computer readable media and interfaces for various other types of computer readable media. Electronic system 900 includes a bus 905, processing unit(s) 910, a system memory 915, a read-only 920, a permanent storage device 925, input devices 930, output devices 935, and a network 940.

The bus 905 collectively represents all system, peripheral, and chipset buses that communicatively connect the numerous internal devices of the electronic system 900. For instance, the bus 905 communicatively connects the processing unit(s) 910 with the read-only 920, the system memory 915, and the permanent storage device 925.

From these various memory units, the processing unit(s) 910 retrieves instructions to execute and data to process in order to execute the processes of the invention. The processing unit(s) may be a single processor or a multi-core processor in different embodiments.

The read-only-memory (ROM) 920 stores static data and instructions that are needed by the processing unit(s) 910 and other modules of the electronic system. The permanent storage device 925, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 925.

Other embodiments use a removable storage device (such as a floppy disk or a flash drive) as the permanent storage device 925. Like the permanent storage device 925, the system memory 915 is a read-and-write memory device. However, unlike storage device 925, the system memory 915 is a volatile read-and-write memory, such as a random access memory. The system memory 915 stores some of the instructions and data that the processor needs at runtime. In some embodiments, the invention's processes are stored in the system memory 915, the permanent storage device 925, and/or the read-only 920. For example, the various memory units include instructions for processing appearance alterations of displayable characters in accordance with some embodiments. From these various memory units, the processing unit(s) 910 retrieves instructions to execute and data to process in order to execute the processes of some embodiments.

The bus 905 also connects to the input and output devices 930 and 935. The input devices enable the user to communicate information and select commands to the electronic system. The input devices 930 include alphanumeric keyboards and pointing or cursor control devices. The output devices 935 display images generated by the electronic system 900. The output devices 935 include printers and display devices, such as cathode ray tubes (CRT) or liquid crystal displays (LCD). Some embodiments include a touchscreen that functions as both an input and output device.

Finally, as shown in FIG. 9, bus 905 also couples electronic system 900 to a network 940 through a network adapter (not shown). In this manner, the computer can be a part of a network of computers (such as a local area network ("LAN"), a wide area network ("WAN"), or an Intranet), or a network of networks (such as the Internet). Any or all components of electronic system 900 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 3 and 6-8 conceptually illustrate processes. The specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

We claim:

1. A conversational and live interactions development and marketplace distribution system that enhances customer engagement experiences by way of live interactions that support live lead engagement and call-to-action strategy over social media and digital messaging channels comprising:
    a cloud server that hosts a conversational and live interactions development and distribution cloud service that provides a platform for development of live interactions and live interaction plug-ins;
    a software as a service (SaaS) interface that includes a web interface that connects SaaS users to the cloud server to use the conversational and live interactions development and distribution cloud service to develop and deploy live interactions across a plurality of social media and digital messaging channels, wherein the plurality of social media and digital messaging channels are registered in a channel registry to allow for engagement of a consumer by way of a particular live interaction;
    a cloud-based live interaction plug-ins marketplace that provides access to developer-built live interaction plug-ins for distribution of live interactions;
    a library of micro services accessible through the cloud-based live interaction plug-ins marketplace, wherein the library of micro services comprises widgets, plug-ins, add-ons, chatbot listeners, and extensions that are compatible with live interactions via the plurality of social media and digital messaging channels, wherein the live interactions comprise a plurality chatbots;
    a conversation builder for users to build live interaction extensions by way of a code-free web interface and access to the library of micro services through the cloud-based live interaction plug-ins marketplace, wherein the plurality of chatbots are extended to include chatbot listeners accessed from the library of micro services;
    a developer interface through which users access the conversation builder and the library of micro services to build the live interaction extensions, components, and micro services, wherein the live interaction extensions, components, and micro services are submitted to the cloud-based live interaction plug-ins marketplace;
    a templates and content category of user interface tools via the SaaS interface and comprising content editors, layout designers, a media manager, a versioning system, a testing system, and a templates and content marketplace;
    a set of standard templates accessible through the templates and content marketplace, wherein the set of standard templates facilitate stateful live interactions over a network of stateful live interactions comprising web pop-ups over the plurality of social media and digital messaging channels, wherein the set of standard templates are accessible through the templates and content marketplace based on the cloud-based live interaction plug-ins marketplace bridging the developer interface with the SaaS interface by parsing the live interaction extensions, components, and micro services to the set of standard templates for consumption by the SaaS interface;
    a channel template parser and chat flow interaction engine comprising an instant memory component and a channel agnostic model, wherein the channel template parser and chat flow interaction engine uses the channel agnostic model to serve and preserve state of interactions over any channel; and
    a conversation engine that monitors events and activities captured by the chatbot listeners for the plurality of chatbots and triggers each live interaction of a corresponding chatbot to respond to the events and activities captured by the chatbot listener, wherein the conversation engine overcomes time delay and interruption events during the live interaction by realtime access to the state of interactions preserved by the instant memory component of the channel template parser and chat flow interaction engine to seamlessly engage an audience during the live interaction with the audience for each corresponding chatbot.

2. The conversational and live interactions development and marketplace distribution system of claim 1, wherein the live interactions further comprise at least one of alive conversational interaction plug-in accessed from the cloud-based live interaction plug-ins marketplace and a smart human chat component.

3. The conversational and live interactions development and marketplace distribution system of claim 2, wherein the versioning system utilizes a versioning model to support different versions of live interaction instances to run concurrently, wherein a first chatbot in the plurality of chatbots is a first chatbot version with a first version of a chatbot listener and a second chatbot in the plurality of chatbots is a second chatbot version with a second version of the chatbot listener.

4. The conversational and live interactions development and marketplace distribution system of claim 1 further comprising a plurality of template base models, a plurality of template group models, a plurality of special templates, and a plurality of custom constructed templates, wherein the plurality of template base models comprise a template message model, a template question model, a template media model, a template API model, and a template callback model, wherein the set of standard templates are based on one or more of the plurality of template base models.

5. A method for enhancing customer engagement experiences by way of live interactions that support live lead engagement and call-to-action strategy over social media and digital messaging channels comprising:

providing, by a conversational and live interactions development and distribution cloud service hosted by a cloud server, a platform for development of live interactions and live interaction plug-ins;

connecting, by way of a web interface of a software as a service (SaaS) interface, SaaS users to the cloud server to use the conversational and live interactions development and distribution cloud service to develop and deploy live interactions across a plurality of social media and digital messaging channels, wherein the plurality of social media and digital messaging channels are registered in a channel registry to allow for engagement of a consumer by way of a particular live interaction;

providing access, in a cloud-based live interaction plug-ins marketplace, to developer-built live interaction plug-ins for distribution of live interactions;

providing access to a library of micro services through the cloud-based live interaction plug-ins marketplace, wherein the library of micro services comprises widgets, plug-ins, add-ons, chatbot listeners, and extensions that are compatible with live interactions via the plurality of social media and digital messaging channels, wherein the live interactions comprise a plurality chatbots;

providing a conversation builder for users to build live interaction extensions by way of a code-free web interface and access to the library of micro services through the cloud-based live interaction plug-ins marketplace, wherein the plurality of chatbots are extended to include chatbot listeners accessed from the library of micro services;

providing a developer interface through which users access the conversation builder and the library of micro services to build the live interaction extensions, components, and micro services, wherein the live interaction extensions, components, and micro services are submitted to the cloud-based live interaction plug-ins marketplace;

providing a templates and content category of user interface tools via the SaaS interface and comprising content editors, layout designers, a media manager, a versioning system, a testing system, and a templates and content marketplace;

facilitating stateful live interactions, by a set of standard templates accessible through the templates and content marketplace, over a network of stateful live interactions comprising web pop-ups over the plurality of social media and digital messaging channels, wherein the set of standard templates are accessible through the templates and content marketplace based on the cloud-based live interaction plug-ins marketplace bridging the developer interface with the SaaS interface by parsing the live interaction extensions, components, and micro services to the set of standard templates for consumption by the SaaS interface;

using a channel agnostic model, by a channel template parser and chat flow interaction engine comprising an instant memory component and the channel agnostic model, to serve and preserve state of interactions over any channel; and monitoring events and activities captured by the chatbot listeners for the plurality of chatbots and triggering each live interaction of a corresponding chatbot, by a conversation engine, to respond to the events and activities captured by the chatbot listener, wherein the conversation engine overcomes time delay and interruption events during the live interaction by realtime access to the state of interactions preserved by the instant memory component of the channel template parser and chat flow interaction engine to seamlessly engage an audience during the live interaction with the audience for each corresponding chatbot.

6. The method for enhancing customer engagement experiences by way of live interactions that support live lead engagement and call-to-action strategy over social media and digital messaging channels of claim 5, wherein the live interactions further comprise at least one of a live conversational interaction plug-in accessed from the cloud-based live interaction plug-ins marketplace and a smart human chat component.

7. The method for enhancing customer engagement experiences by way of live interactions that support live lead engagement and call-to-action strategy over social media and digital messaging channels of claim 6, wherein the versioning system utilizes a versioning model to support different versions of live interaction instances to run concurrently, wherein a first chatbot in the plurality of chatbots is a first chatbot version with a first version of a chatbot listener and a second chatbot in the plurality of chatbots is a second chatbot version with a second version of the chatbot listener.

8. The method for enhancing customer engagement experiences by way of live interactions that support live lead engagement and call-to-action strategy over social media and digital messaging channels of claim 5 further comprising providing a plurality of template base models, a plurality of template group models, a plurality of special templates, and a plurality of custom constructed templates, wherein the plurality of template base models comprise a template message model, a template question model, a template media model, a template API model, and a template callback model, wherein the set of standard templates are based on one or more of the plurality of template base models.

9. A non-transitory computer readable medium that stores a program, which when executed by at least one processing unit of a conversational and live interactions development and marketplace distribution system server, enhances customer engagement experiences by way of live interactions that support live lead engagement and call-to-action strategy over social media and digital messaging channels, said program comprising sets of instructions for:

hosting, by a conversational and live interactions development and marketplace distribution system server, a conversational and live interactions development and distribution cloud service;

providing, by the conversational and live interactions development and distribution cloud service, a platform for development of live interactions and live interaction plug-ins;

connecting, by way of a web interface of a software as a service (SaaS) interface of the conversational and live interactions development and distribution cloud service, SaaS users to the conversational and live interactions development and marketplace distribution system server to use the conversational and live interactions development and distribution cloud service to develop and deploy live interactions across a plurality of social media and digital messaging channels, wherein the plurality of social media and digital messaging channels are registered in a channel registry to allow for engagement of a consumer by way of a particular live interaction;

providing a cloud-based live interaction plug-ins marketplace, accessible through the conversational and live interactions development and distribution cloud service, of developer-built live interaction plug-ins for distribution of live interactions;

providing, by the conversational and live interactions development and distribution cloud service, a library of micro services through the cloud-based live interaction plug-ins marketplace, wherein the library of micro services comprises widgets, plug-ins, add-ons, chatbot listeners, and extensions that are compatible with live interactions via the plurality of social media and digital messaging channels, wherein the live interactions comprise a plurality chatbots;

providing, by the conversational and live interactions development and distribution cloud service, a conversation builder for users to build live interaction extensions by way of a code-free web interface and access to the library of micro services through the cloud-based live interaction plug-ins marketplace, wherein the plurality of chatbots are extended to include chatbot listeners accessed from the library of micro services;

providing, by the conversational and live interactions development and distribution cloud service, a developer interface through which users access the conversation builder and the library of micro services to build the live interaction extensions, components, and micro services, wherein the live interaction extensions, components, and micro services are submitted to the cloud-based live interaction plug-ins marketplace;

providing, via the SaaS interface of the conversational and live interactions development and distribution cloud service, a templates and content category of user interface tools comprising content editors, layout designers, a media manager, a versioning system, a testing system, and a templates and content marketplace;

facilitating stateful live interactions, by a set of standard templates accessible through the templates and content marketplace, over a network of stateful live interactions comprising web pop-ups over the plurality of social media and digital messaging channels, wherein the set of standard templates are accessible through the templates and content marketplace based on the cloud-based live interaction plug-ins marketplace bridging the developer interface with the SaaS interface by parsing the live interaction extensions, components, and micro services to the set of standard templates for consumption by the SaaS interface;

using a channel agnostic model, by a channel template parser and chat flow interaction engine comprising an instant memory component and the channel agnostic model, to serve and preserve state of interactions over any channel; and monitoring events and activities captured by the chatbot listeners for the plurality of chatbots and triggering each live interaction of a corresponding chatbot, by a conversation engine of the conversational and live interactions development and distribution cloud service, to respond to the events and activities captured by the chatbot listener, wherein the conversation engine overcomes time delay and interruption events during the live interaction by realtime access to the state of interactions preserved by the instant memory component of the channel template parser and chat flow interaction engine to seamlessly engage an audience during the live interaction with the audience for each corresponding chatbot.

10. The non-transitory computer readable medium of claim 9, wherein the live interactions further comprise at least one of a live conversational interaction plug-in accessed from the cloud-based live interaction plug-ins marketplace and a smart human chat component.

11. The non-transitory computer readable medium of claim 10, wherein the versioning system utilizes a versioning model to support different versions of live interaction instances to run concurrently, wherein a first chatbot in the plurality of chatbots is a first chatbot version with a first version of a chatbot listener and a second chatbot in the plurality of chatbots is a second chatbot version with a second version of the chatbot listener.

12. The non-transitory computer readable medium of claim 9 further comprising providing a plurality of template base models accessible through the conversational and live interactions development and distribution cloud service, a plurality of template group models accessible through the conversational and live interactions development and distribution cloud service, a plurality of special templates accessible through the conversational and live interactions development and distribution cloud service, and a plurality of custom constructed templates accessible through the conversational and live interactions development and distribution cloud service, wherein the plurality of template base models comprise a template message model, a template question model, a template media model, a template API model, and a template callback model, wherein the set of standard templates are based on one or more of the plurality of template base models.

* * * * *